(12) United States Patent
Richardson

(10) Patent No.: US 9,220,235 B2
(45) Date of Patent: Dec. 29, 2015

(54) PET BEDS AND METHODS FOR CONSTRUCTING PET BEDS

(71) Applicant: Lyle C. Richardson, Marietta, GA (US)

(72) Inventor: Lyle C. Richardson, Marietta, GA (US)

( * ) Notice: Subject to any disclaimer, the term of this patent is extended or adjusted under 35 U.S.C. 154(b) by 231 days.

(21) Appl. No.: 13/946,055

(22) Filed: Jul. 19, 2013

(65) Prior Publication Data

US 2014/0041592 A1 Feb. 13, 2014

Related U.S. Application Data

(60) Provisional application No. 61/722,323, filed on Nov. 5, 2012, provisional application No. 61/682,636, filed on Aug. 13, 2012.

(51) Int. Cl.
*A01K 1/035* (2006.01)

(52) U.S. Cl.
CPC ......... *A01K 1/0353* (2013.01); *Y10T 29/49826* (2015.01)

(58) Field of Classification Search
CPC .................................................. A01K 1/0353
USPC ........................................ 119/28.5; D30/118
See application file for complete search history.

(56) References Cited

U.S. PATENT DOCUMENTS

| | | | | |
|---|---|---|---|---|
| 4,038,123 A * | 7/1977 | Sammis | ........................ | 156/240 |
| 4,284,456 A * | 8/1981 | Hare | ............................ | 156/234 |
| 4,539,935 A * | 9/1985 | Meyer | .......................... | 119/28.5 |
| 4,564,406 A * | 1/1986 | Binks | .............................. | 156/63 |
| 5,311,837 A * | 5/1994 | Mamer-Boellstorff | ...... | 119/28.5 |
| 5,588,393 A * | 12/1996 | Heilborn | ...................... | 119/28.5 |
| 6,196,156 B1 * | 3/2001 | Denesuk et al. | ............. | 119/28.5 |
| 6,237,531 B1 * | 5/2001 | Peeples et al. | ............... | 119/28.5 |
| 6,668,394 B2 * | 12/2003 | Walpin | ............................. | 5/17 |
| 6,851,385 B1 * | 2/2005 | Poss et al. | ..................... | 119/28.5 |
| D572,936 S * | 7/2008 | Lester et al. | ................... | D6/388 |
| 7,459,052 B2 * | 12/2008 | Tweel et al. | ................... | 156/241 |
| D600,044 S * | 9/2009 | Lester et al. | ................... | D6/388 |
| D673,332 S * | 12/2012 | Goding | ........................ | D30/118 |
| 8,353,245 B2 * | 1/2013 | Zinman | ......................... | 101/34 |
| 8,539,909 B2 * | 9/2013 | Williams | ...................... | 119/28.5 |
| D703,877 S * | 4/2014 | Popkin et al. | ................ | D30/118 |
| D728,168 S * | 4/2015 | Richardson | .................. | D30/118 |
| 2005/0087142 A1 * | 4/2005 | Dalal et al. | ................... | 119/28.5 |
| 2009/0023586 A1 * | 1/2009 | Zinman | ......................... | 503/201 |
| 2011/0239946 A1 * | 10/2011 | Ogle | .............................. | 119/28.5 |
| 2012/0240860 A1 * | 9/2012 | Suplina | ........................ | 119/28.5 |

* cited by examiner

*Primary Examiner* — Yvonne Abbott-Lewis
(74) *Attorney, Agent, or Firm* — Laurence P. Colton; Smith Risley Tempel Santos LLC

(57) ABSTRACT

A pet bed includes a base member, a wall connected to and extending from the base member, and an insert that rests on a support surface of the base member within an area bounded by the wall. A surface of the wall includes a first image and a surface of the insert includes a second image. A method for manufacturing the bed includes selecting a set of images, applying the images to respective fabric panels, attaching the fabric panels with the images to opposing fabric panels to create the wall and the insert, attaching the wall to a base member and arranging the insert on the support surface of the base member.

14 Claims, 39 Drawing Sheets

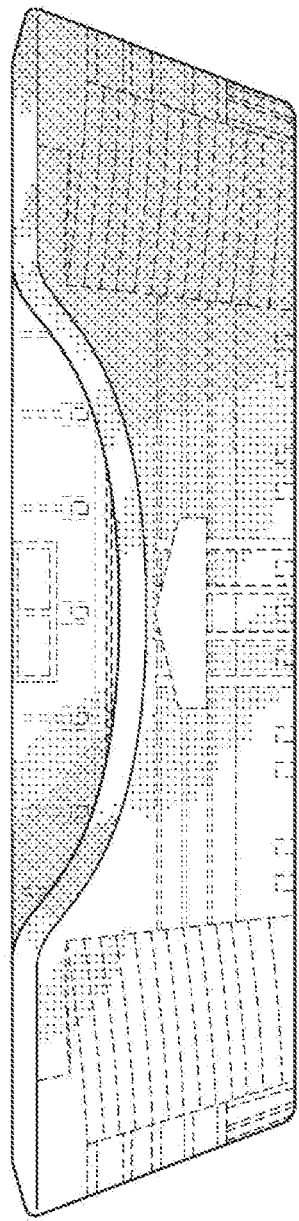
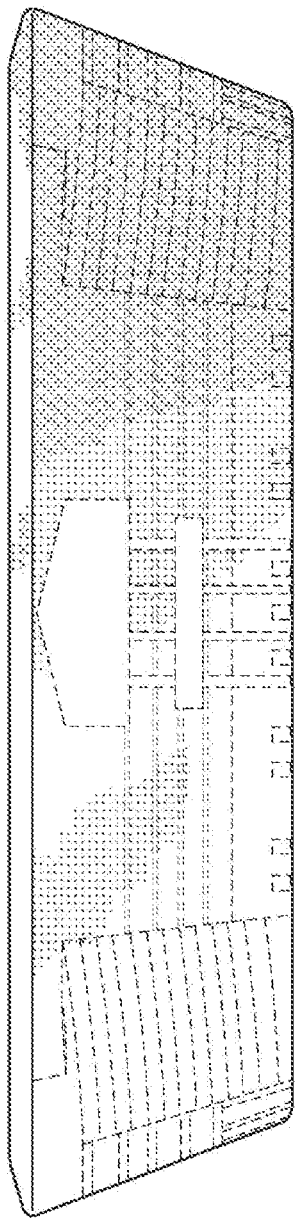
Fig. 6
Fig. 7

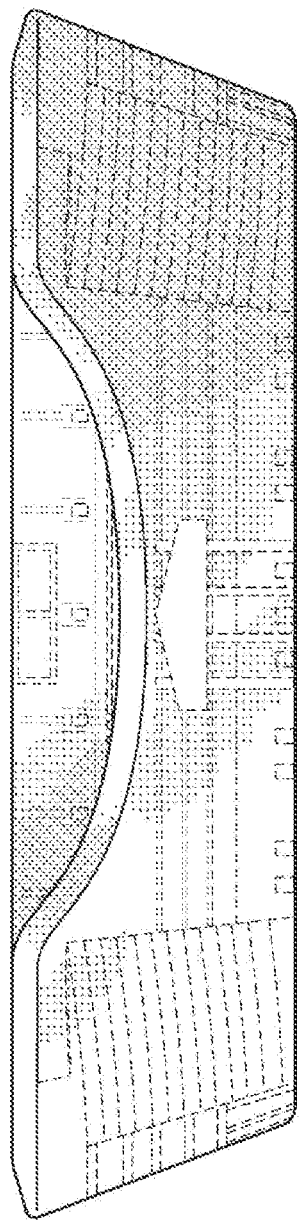
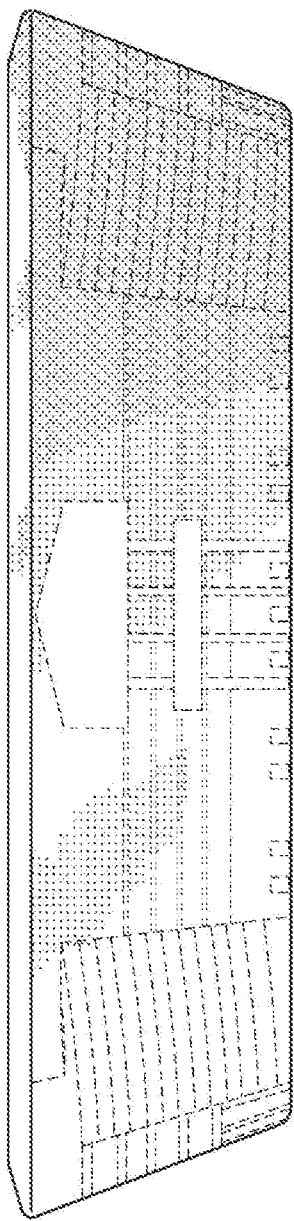
Fig. 33
Fig. 34

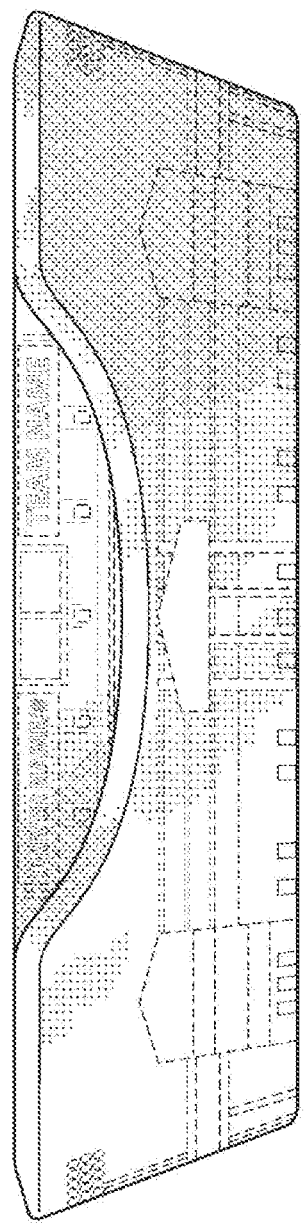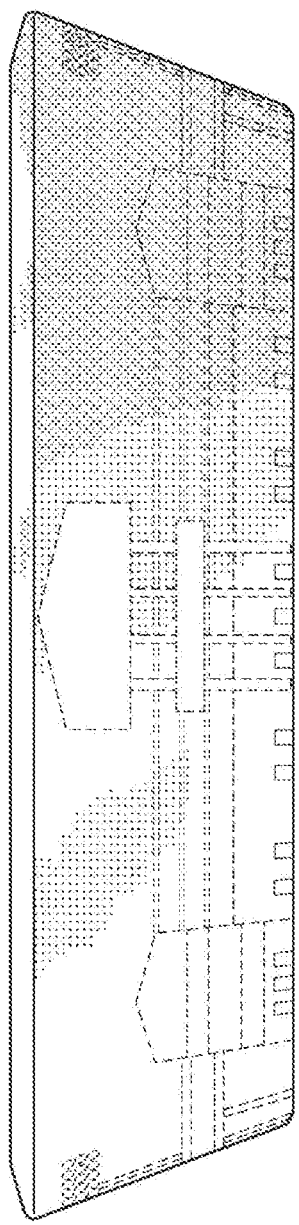

PET BEDS AND METHODS FOR CONSTRUCTING PET BEDS

STATEMENT OF RELATED APPLICATIONS

This application claims the benefit of U.S. Provisional Patent Application No. 61/722,323 having a filing date of 5 Nov. 2012 and U.S. Provisional Patent Application No. 61/682,636 having a filing date of 13 Aug. 2012.

BACKGROUND OF THE INVENTION

1. Technical Field

This invention relates generally to an article of manufacture (e.g., a device) designed for the comfort of a lying or sleeping pet, and more specifically to a bed or sleeping area for a pet.

2. Prior Art

Generally, people want to make their pets or animal companions as comfortable as reasonably possible. In this regard, pet owners often provide "safe places," i.e., familiar, comfortable places, for their pets to retire to when tired or scared. These safe places may take the form of, for example, a favorite corner of a room, a doghouse or a pet bed. Pet beds are popular among pet owners. In fact, pet bed displays frequently take up large display areas in pet shops and pet supply stores. That retail establishments devote so much space to pet beds is indicative of their popularity among pet owners.

A problem with prior art pet beds is that the exterior materials are often selected with manufacturing concerns and perceived comfort of the animal designated for use of the bed in mind. These selections are often made absent consideration of recreational interests and interior decorating themes of the homes of pet owners.

Accordingly, there is a need for a pet bed that provides both a comfortable and safe place for a pet to occupy, rest, or sleep, and satisfies an interior decorating desire of the pet owner. It is to this need and others that the present invention is directed

BRIEF SUMMARY OF THE INVENTION

Embodiments of an improved pet bed include a generally horizontal base member with a wall extending generally vertically and upwardly therefrom. The base member provides for a pace for a pet to occupy, rest, or sleep, and can be a flat or padded component. The wall generally surrounds the base member so as to form an enclosure having an open top. The wall includes at least one region where a height of the wall is shorter than the remaining portions of the wall so as to provide an ingress and egress to the enclosure. An inward facing surface of the wall is arranged with a first representation of a venue, such as an interior view of a stadium. An outward facing surface of the wall can be arranged with a third representation of a venue, such as an exterior view of the stadium. An upper surface of the base member is arranged with a second representation of a venue, such as a field or floor view of the stadium. Alternatively, an insert, arranged to fit within an area surrounded by the wall, can rest on the base member. An upper surface of the insert opposed to the base member (i.e., an observable surface) can be arranged with the second representation.

These features, and other features and advantages of the pet bed will become more apparent to those of ordinary skill in the art when the following detailed description of example embodiments is read in conjunction with the appended figures.

BRIEF DESCRIPTION OF THE DRAWINGS

In the drawings, like reference numerals refer to like parts throughout the various views unless otherwise indicated. The components within the figures are not necessarily to scale, emphasis instead being placed upon clearly illustrating the pet bed and methods for constructing the same.

FIG. 6 is a front plan view of the first embodiment of the pet bed.

FIG. 7 is a rear plan view of the first embodiment of the pet bed.

FIG. 33 is a front plan view of the fourth embodiment of the pet bed.

FIG. 34 is a rear plan view of the fourth embodiment of the pet bed.

FIG. 42 is a front plan view of the fifth embodiment of the pet bed

FIG. 43 is a rear plan view of the fifth embodiment of the pet bed.

DETAILED DESCRIPTION OF PREFERRED EMBODIMENTS

Figure 1:
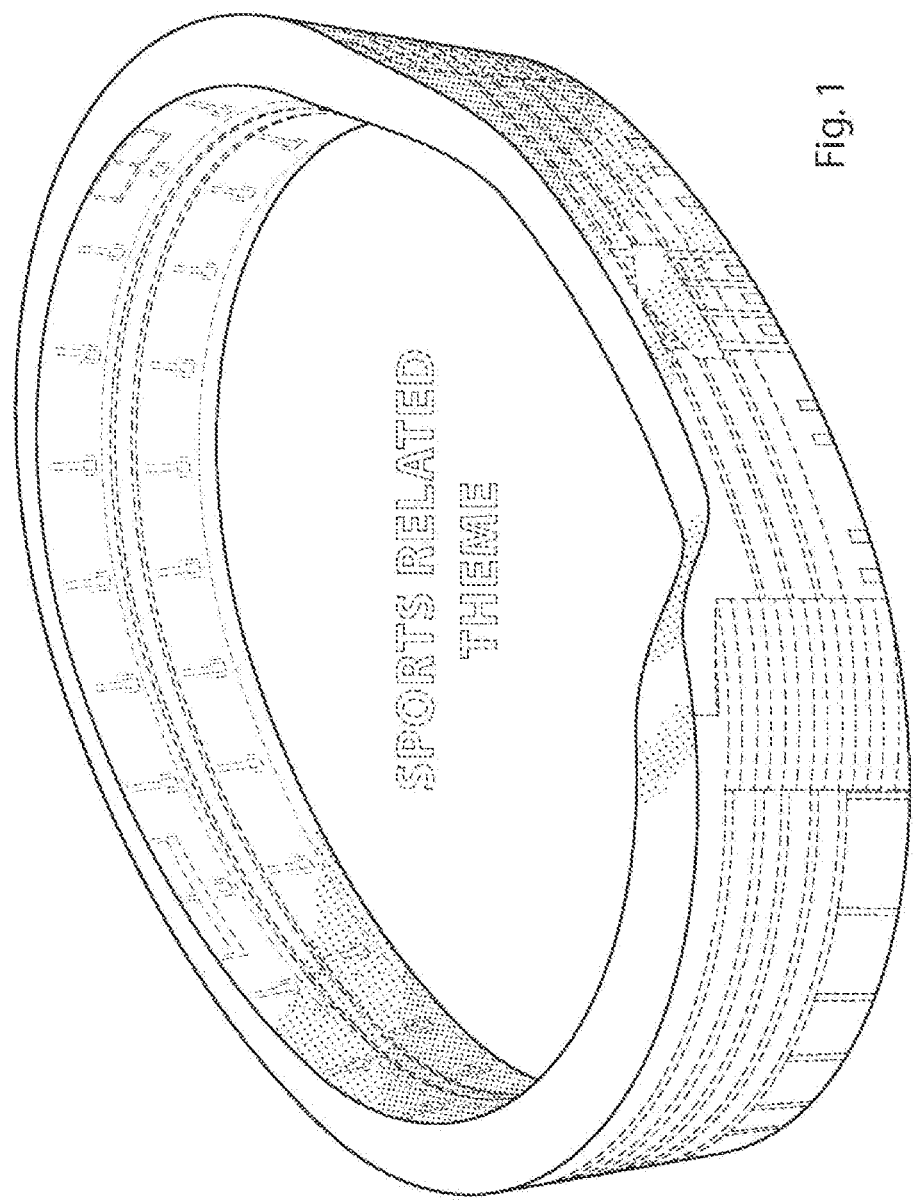
FIG. 1 is a first front-perspective view of a first embodiment of the pet bed of the present invention.
Figure 2:
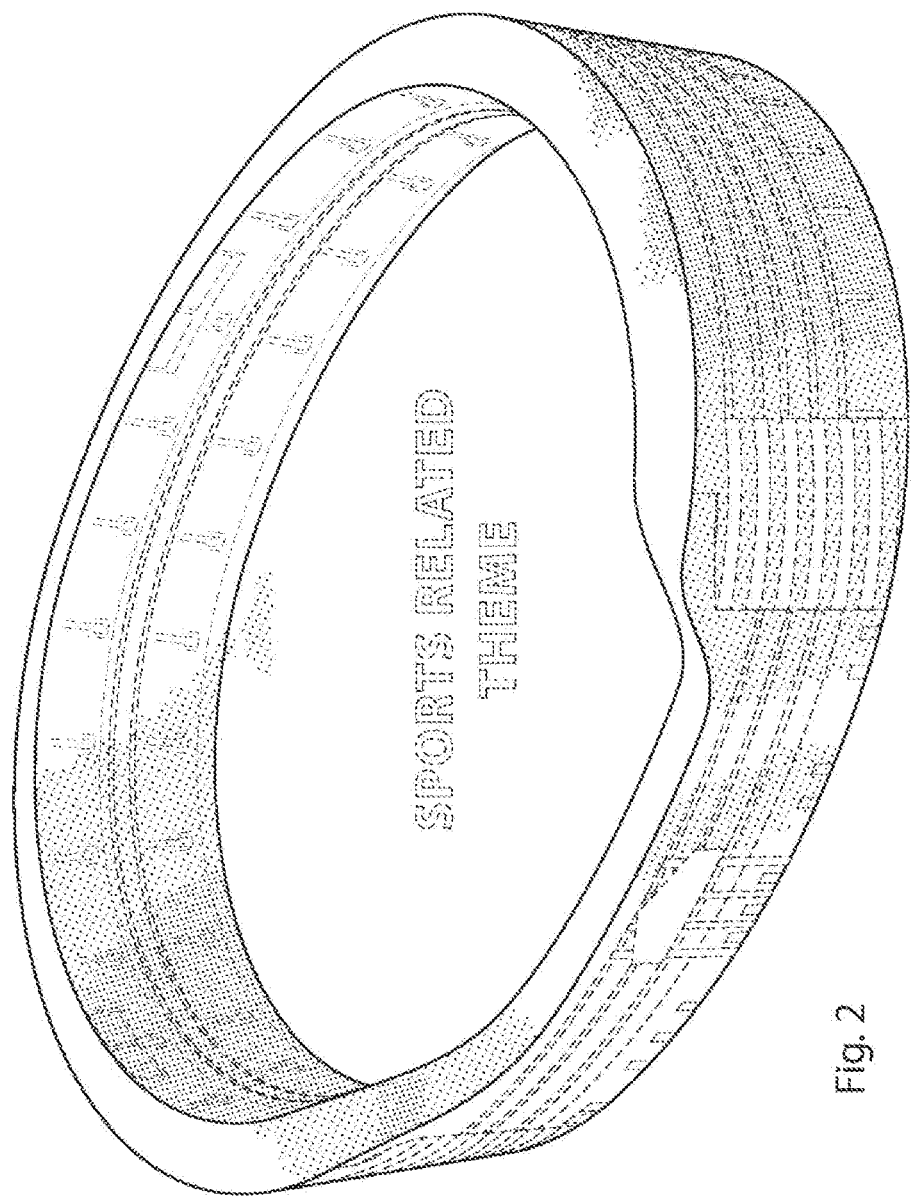
FIG. 2 is a second front-perspective view of the first embodiment of the pet bed.
Figure 3:
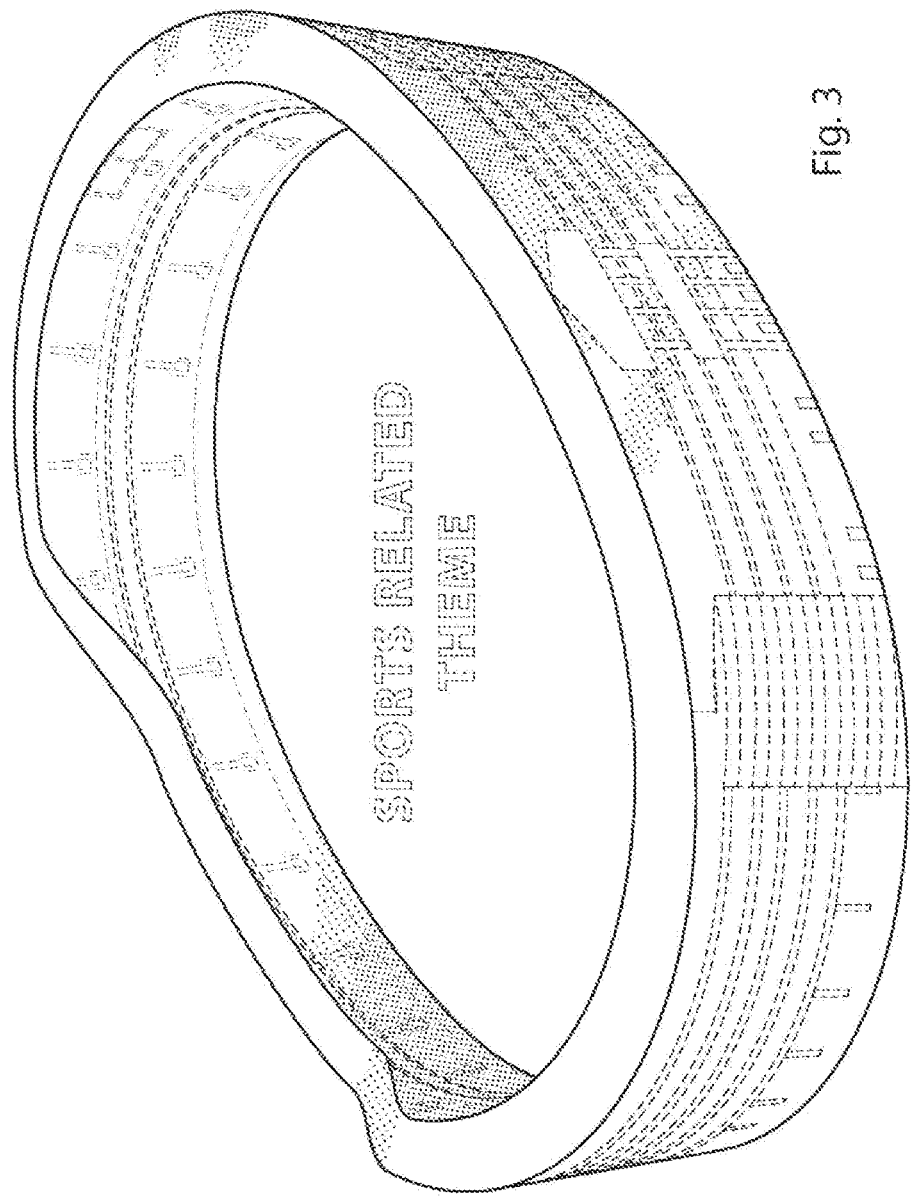
FIG. 3 is a first rear-perspective view of the first embodiment of the pet bed.
Figure 4:
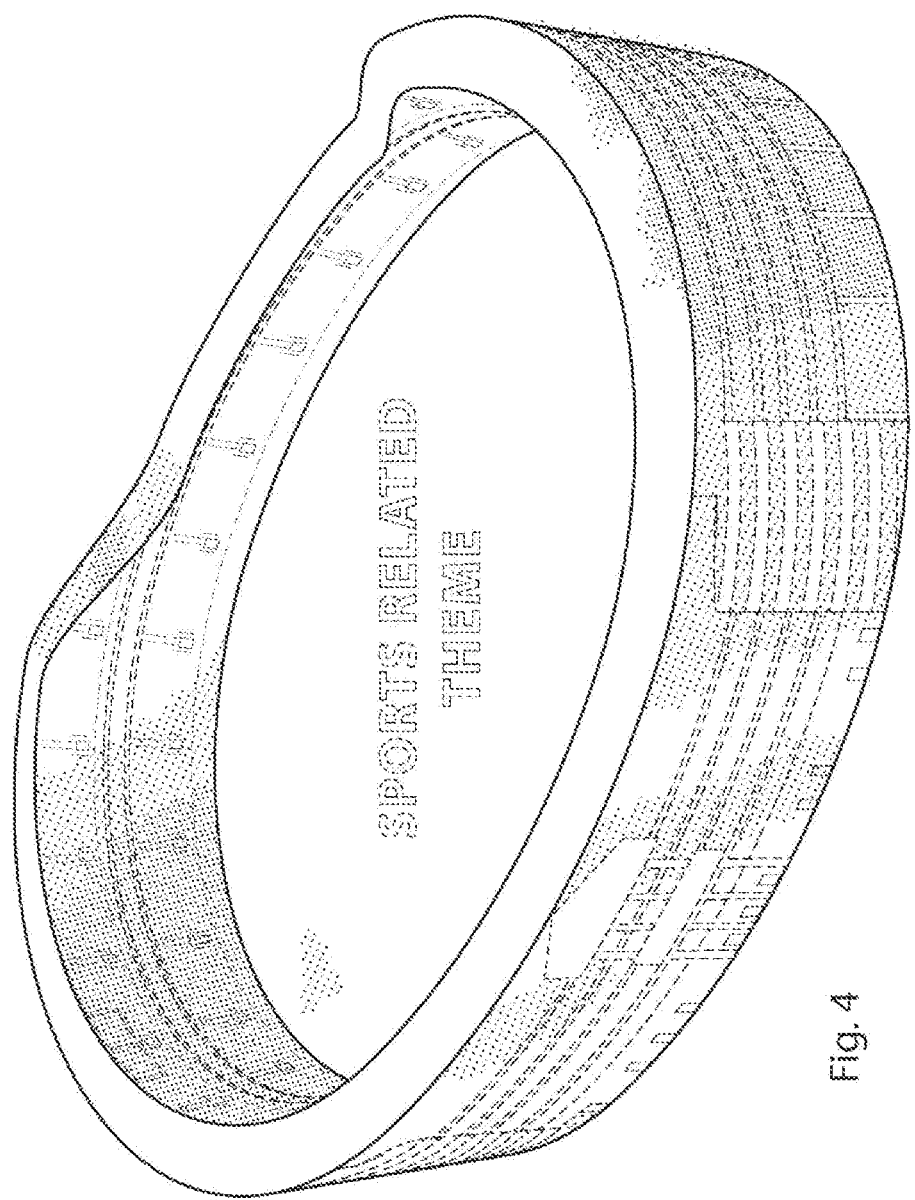
FIG. 4 is a second rear-perspective view of the first embodiment of the pet bed.
Figure 5:
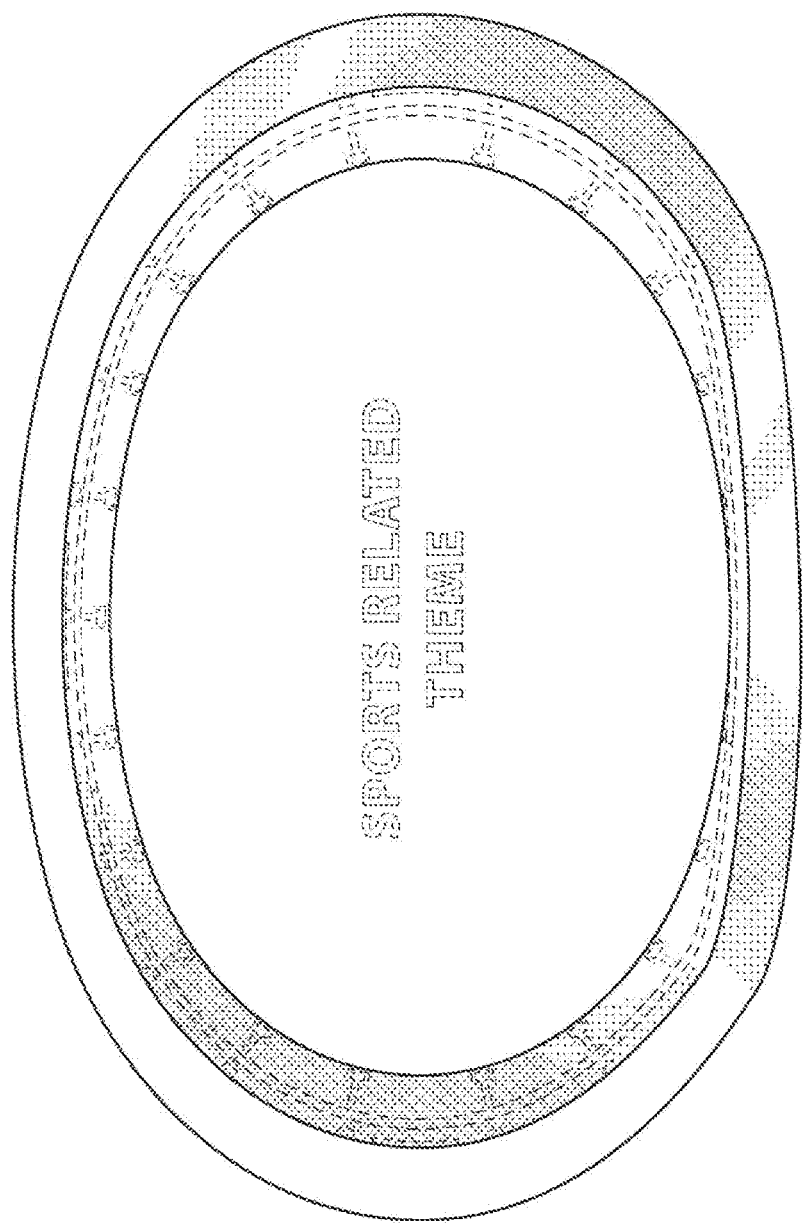
FIG. 5 is a top plan view of the first embodiment of the pet bed.
Figure 8:
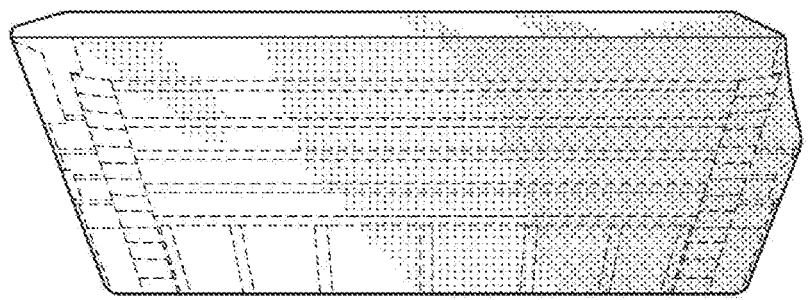
FIG. 8 is a left-side plan view of the first embodiment of the pet bed.
Figure 9:
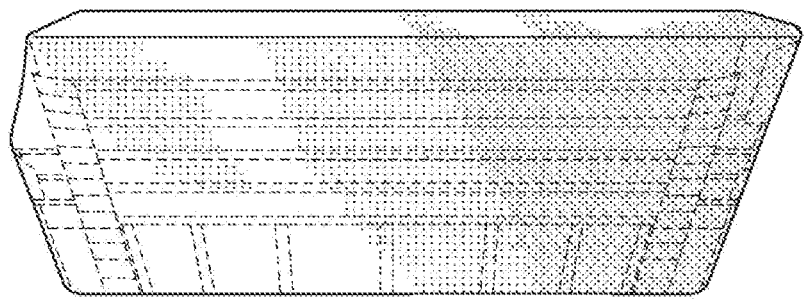
FIG. 9 is a right-side plan view of the first embodiment of the pet bed.
Figure 10:
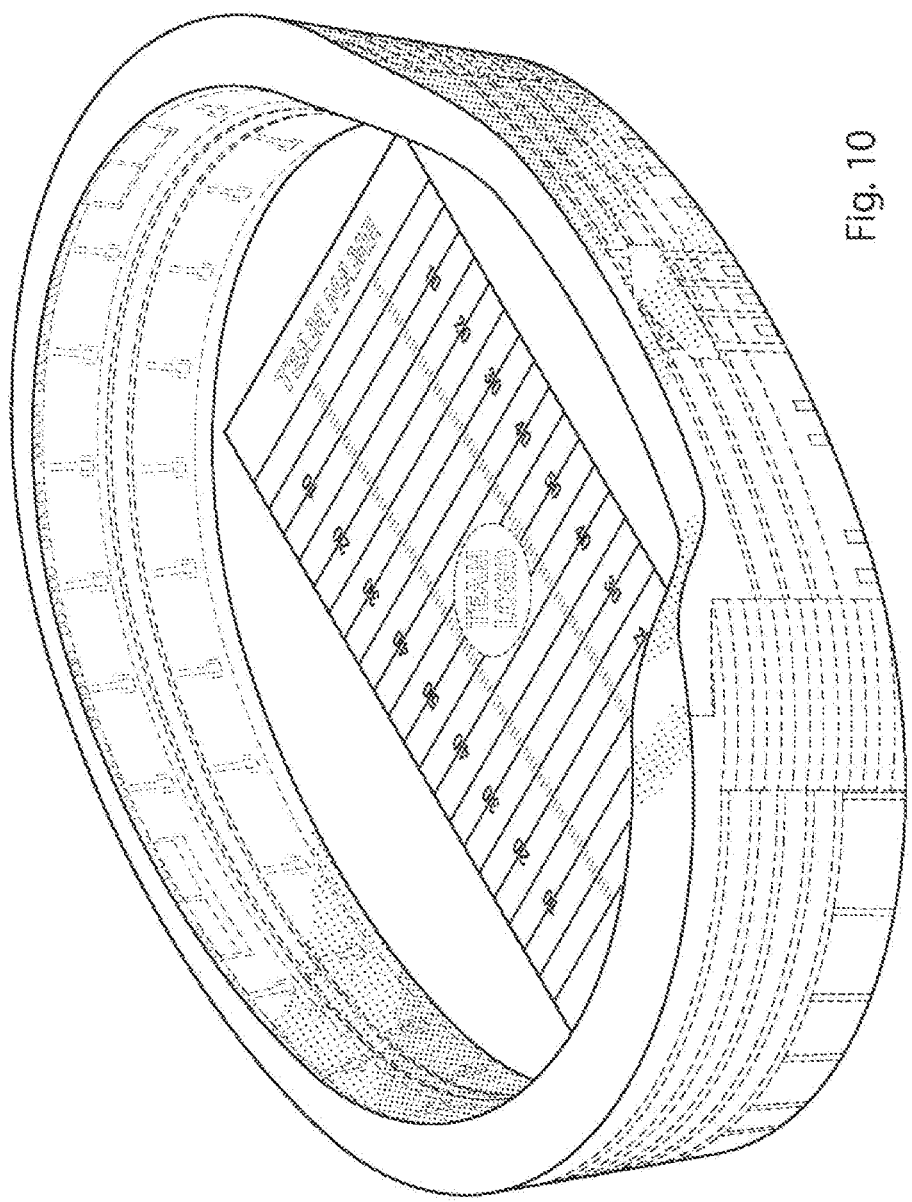
FIG. 10 is a first front-perspective view of a second embodiment of a pet bed of the present invention.
Figure 11:
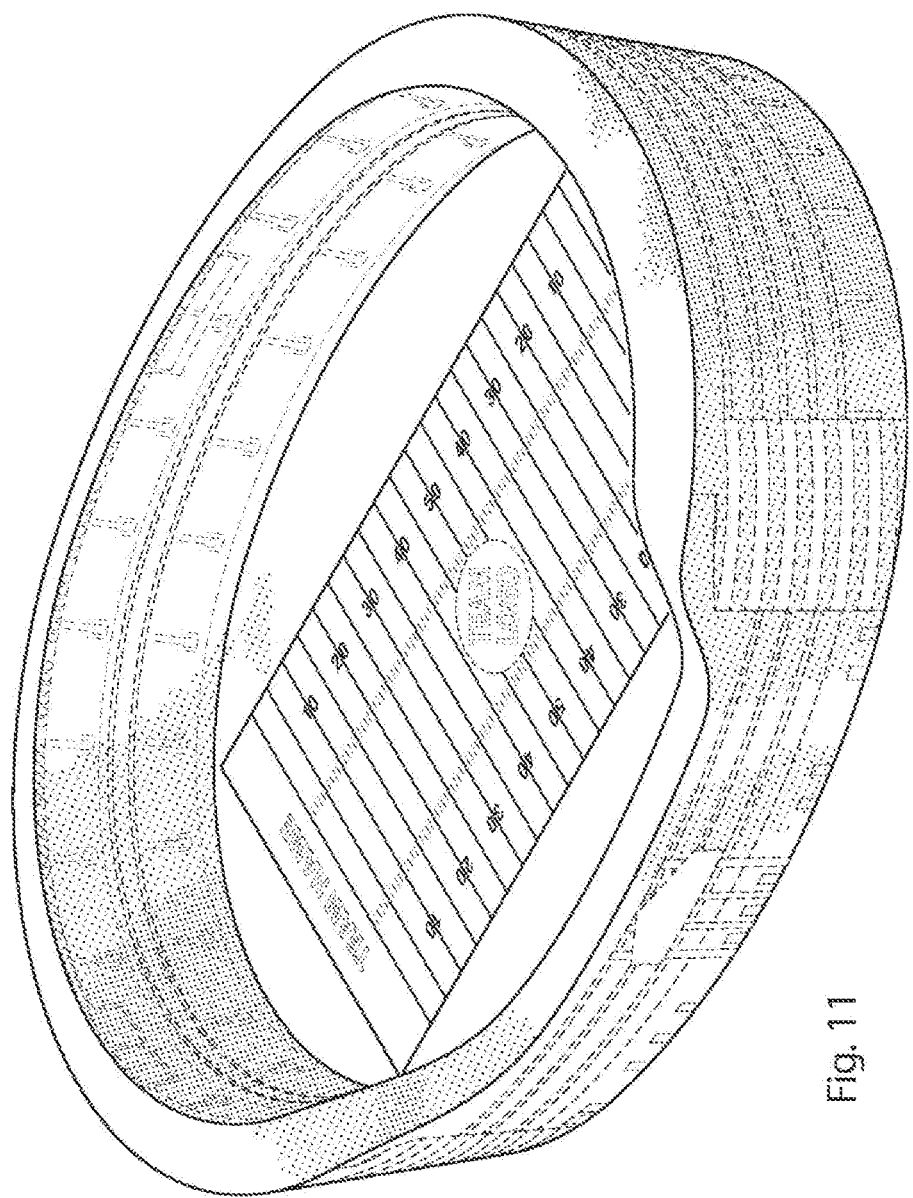
FIG. 11 is a second front-perspective view of the second embodiment of the pet bed.
Figure 12:
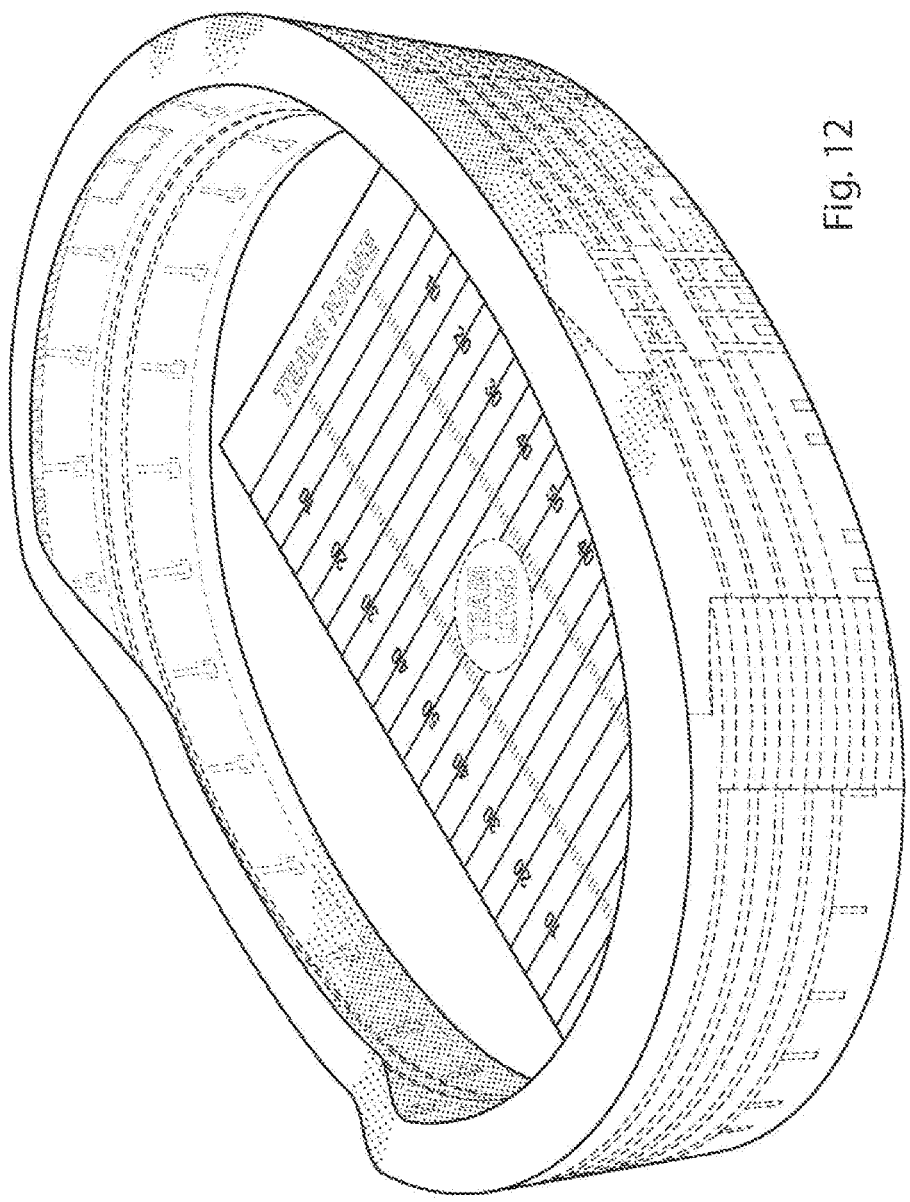
FIG. 12 is a first rear-perspective view of the second embodiment of the pet bed.
Figure 13:
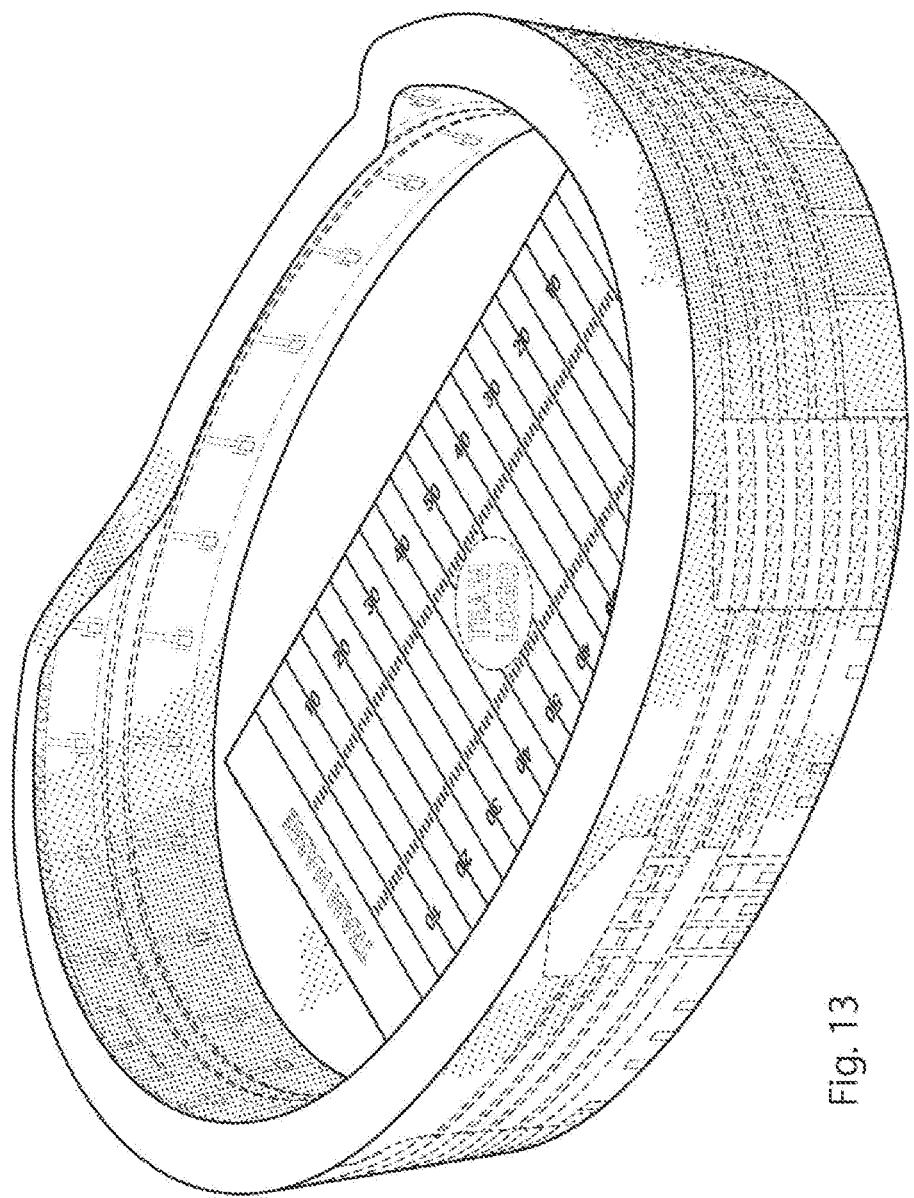
FIG. 13 is a second rear-perspective view of the second embodiment of the pet bed.
Figure 14:
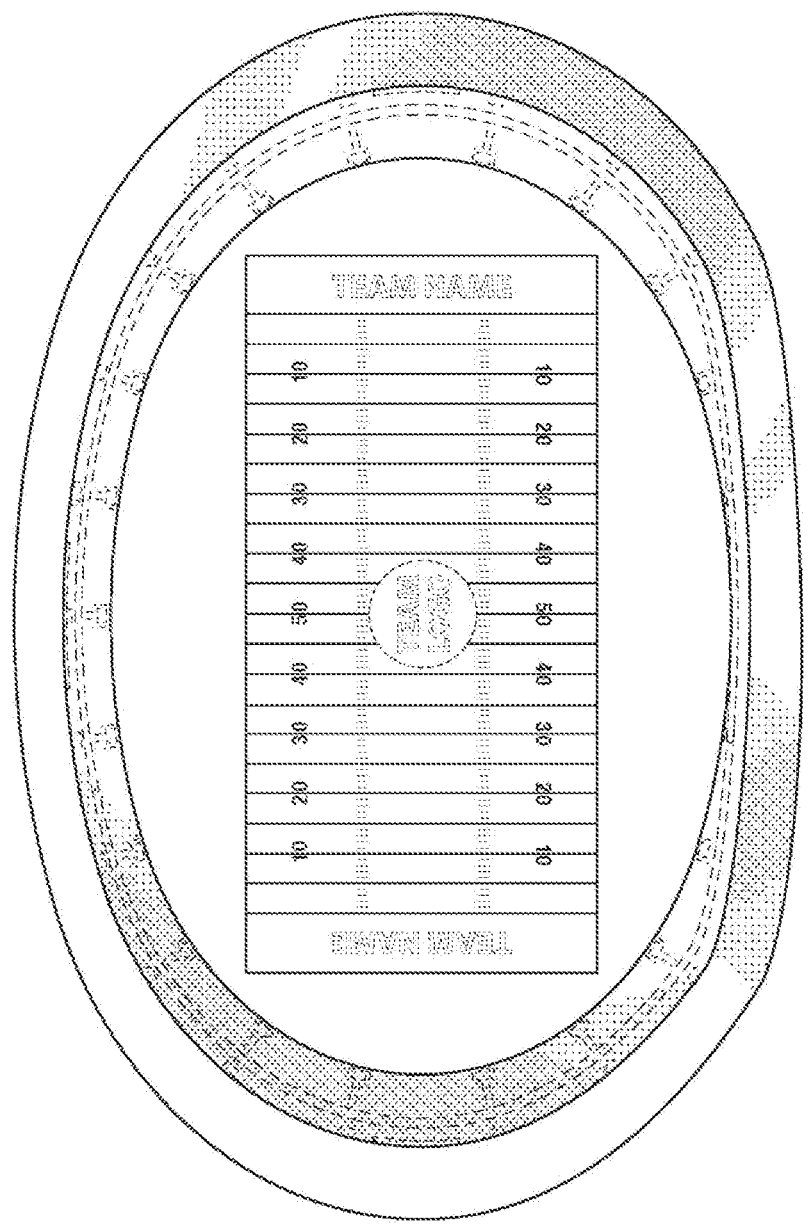
FIG. 14 is a top plan view of the second embodiment of the pet bed.
Figure 15:
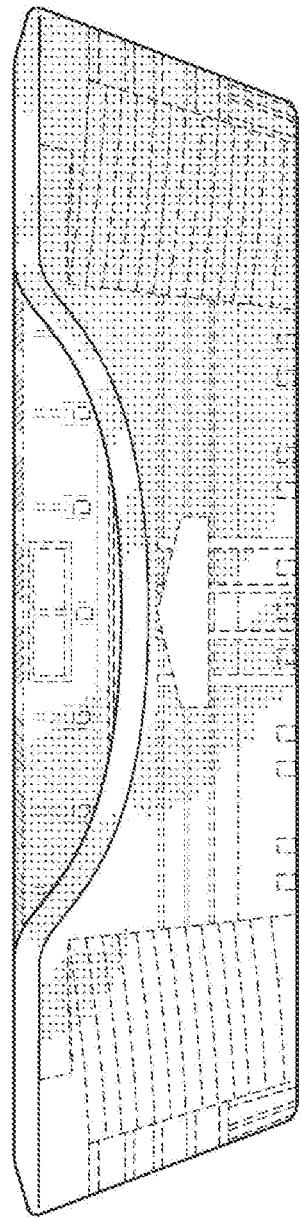
FIG. 15 is a front plan view of the second embodiment of the pet bed.
Figure 16:
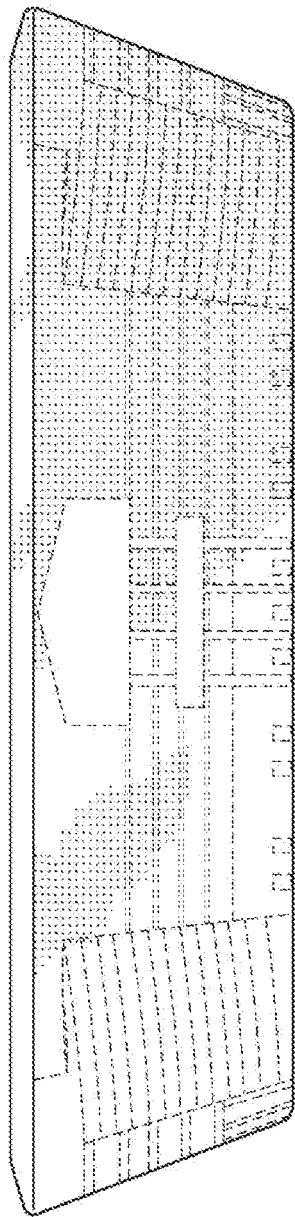
FIG. 16 is a rear plan view of the second embodiment of the pet bed.
Figure 17:
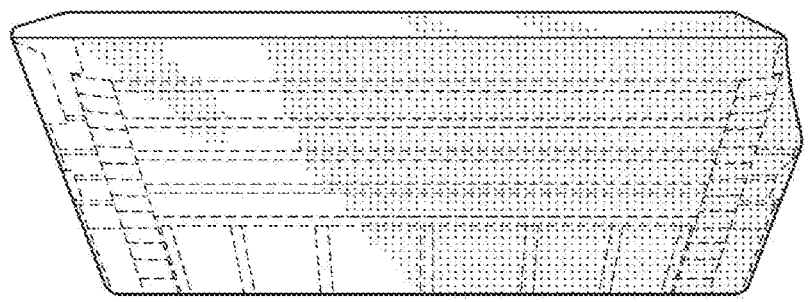
FIG. 17 is a left-side plan view of the second embodiment of the pet bed.
Figure 18:
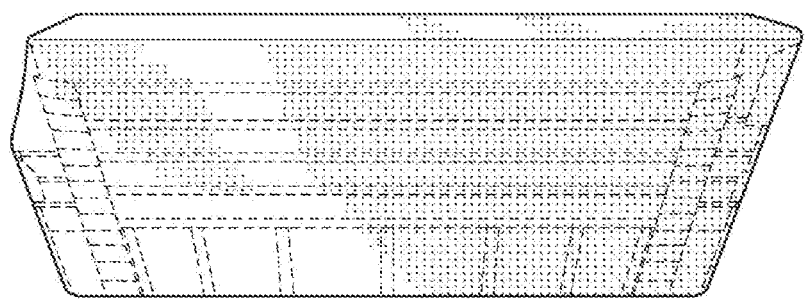
FIG. 18 is a right-side plan view of the second embodiment of the pet bed.

Referring to FIGS. 1-45, several embodiments of the pet bed 10 of the present invention are provided without reference numerals for illustrating a general overall structure for the pet bed 10 and several representative images that can be provided on the various surfaces of the pet bed 10. Referring to FIGS. 46-52, an illustrative structural embodiment of the pet bed 10 of the present invention is provided with reference numerals for illustrating the various components and features of an illustrative embodiment of the invention.

Referring now to FIGS. 1-45, the several embodiments of the pet bed 10 of the present invention provided without reference numerals for illustrating a general overall structure for the pet bed 10 and several representative images that can be provided on the various surfaces of the pet bed 10 are disclosed in more detail.

FIGS. 1-9 include various perspective and plan views of a first embodiment of a pet bed. As shown in FIGS. 1-9, the first embodiment of the pet bed includes images on observable surfaces of the pet bed, including, for example, a sports related theme on a surface of a mattress, pillow or insert upon which the pet can sit, rest, lie, or sleep, and related images on a wall surrounding the mattress, pillow or insert. For example, the surface of the mattress, pillow or insert can include a representation of a field or floor of a sporting venue, and the inward and outward facing surfaces of the wall can include a representation of an inner seating area and outer walls of a sporting venue. FIGS. 1-9 represent a generic venue, such as a stadium, arena, coliseum, dome, park, theater, amphitheater, etc.

FIGS. 10-18 include various perspective and plan views of a second embodiment of a pet bed. The second embodiment of the pet bed includes a representation of football playing field on an observable surface of the pet bed. In the illustrated embodiment, the football playing field is observable on a surface of a mattress, pillow or insert surrounded by a wall. As is further shown, the inward and outward facing surfaces of the wall may include a representation of a venue that hosts a football game. As indicated in FIGS. 10-18, the football field may be accompanied by a team name and a team logo in registration with the 50-yard line and/or an end zone or both end zones.

Figure 19:
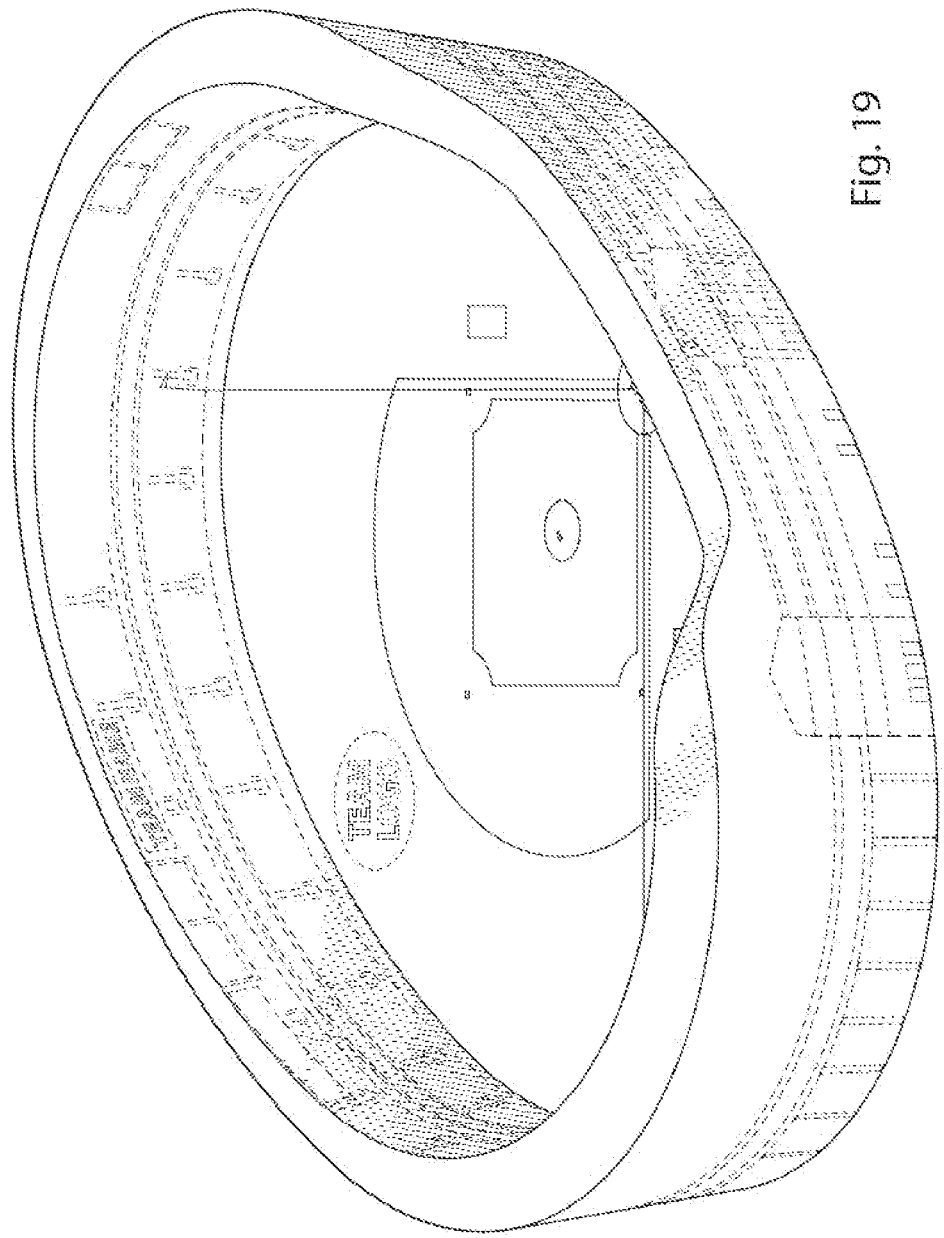
FIG. 19 is a first front-perspective view of a third embodiment of a pet bed of the present invention.
Figure 20:
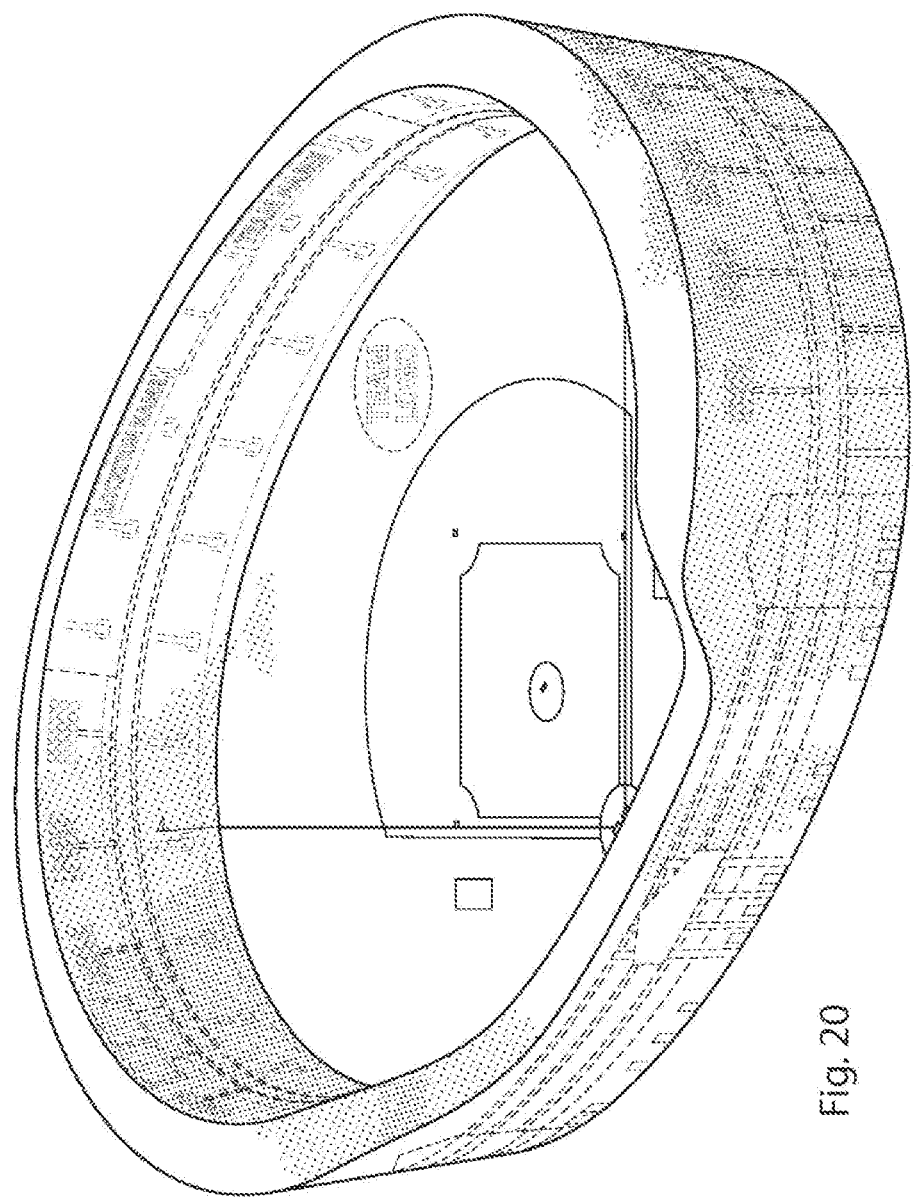
FIG. 20 is a second front-perspective view of the third embodiment of the pet bed.
Figure 21:
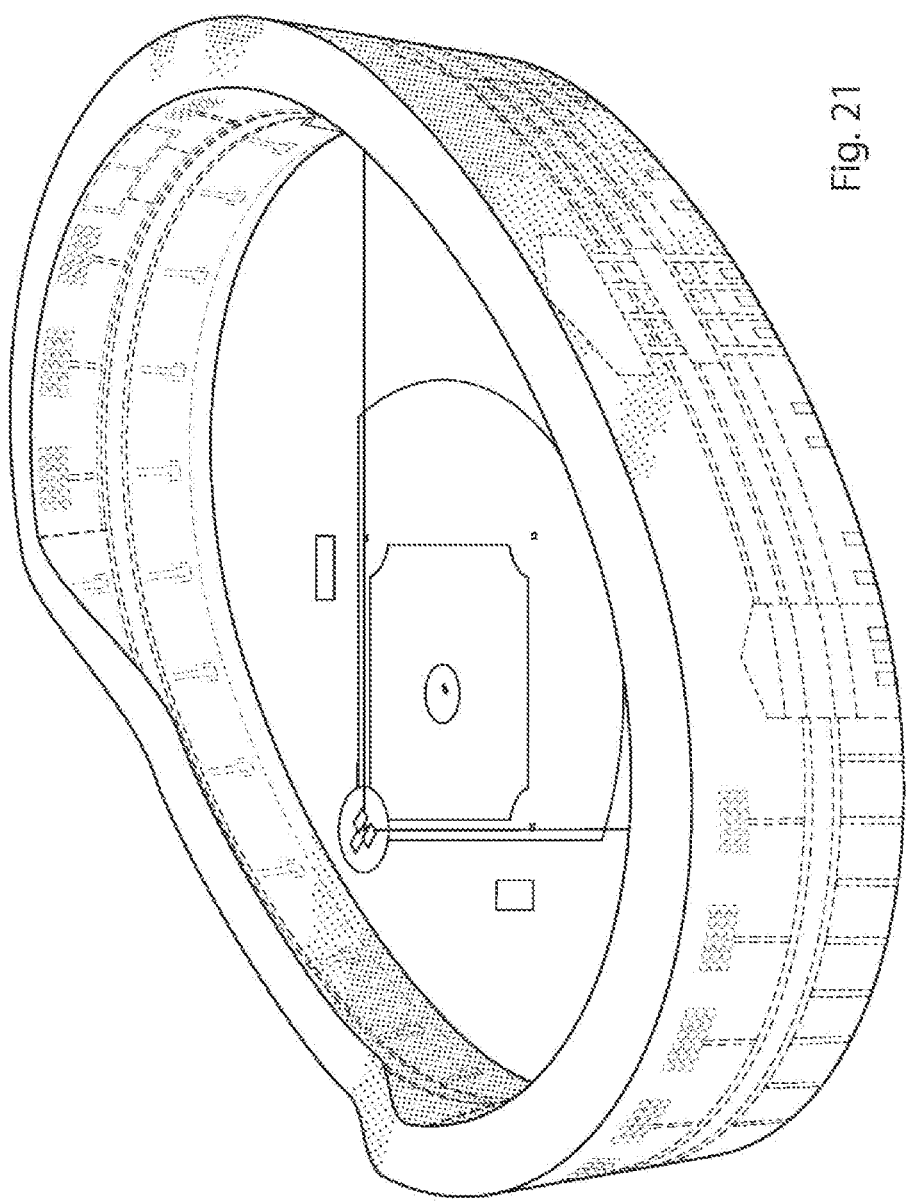
FIG. 21 is a first rear-perspective view of the third embodiment of the pet bed.
Figure 22:
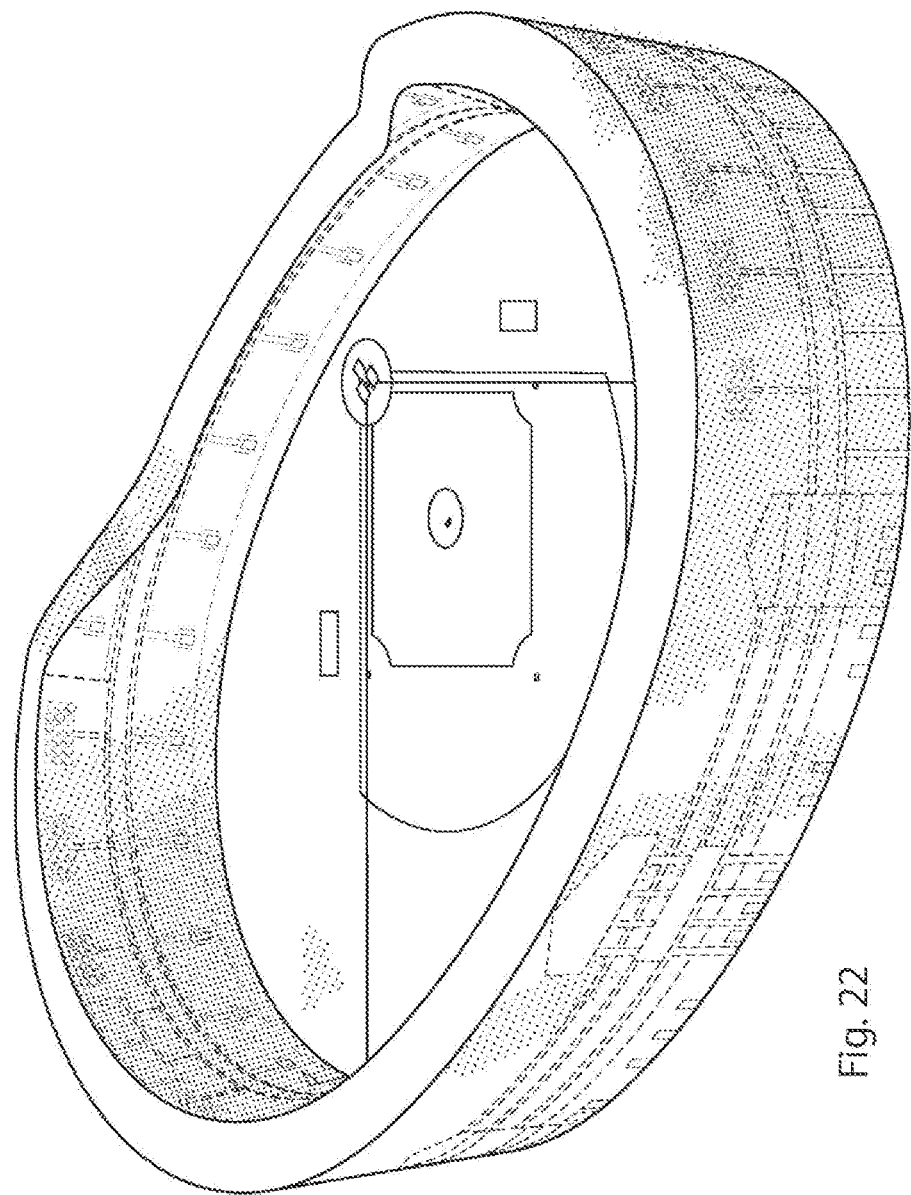
FIG. 22 is a second rear-perspective view of the third embodiment of the pet bed.
Figure 23:
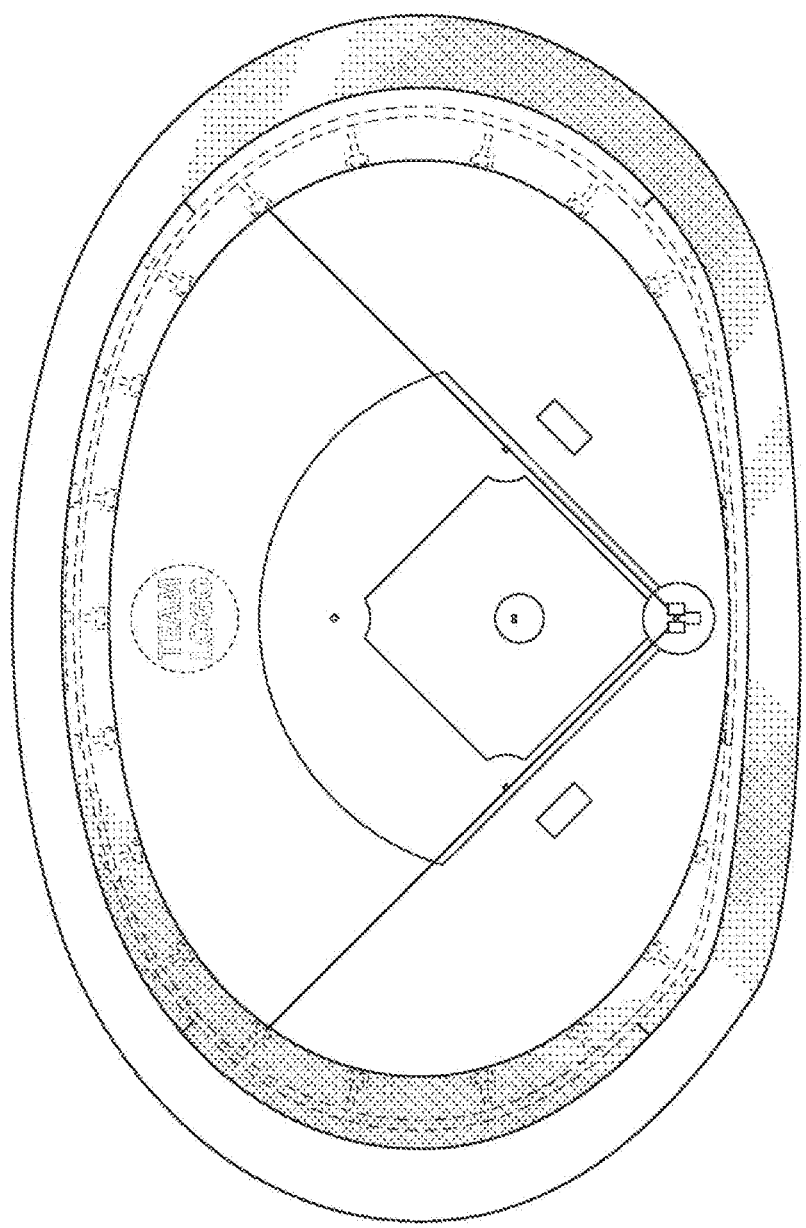
FIG. 23 is a top plan view of the third embodiment of the pet bed.
Figure 24:
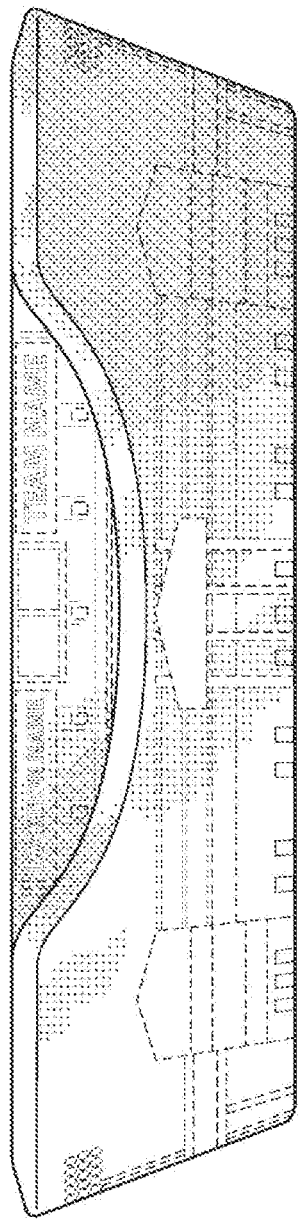
FIG. 24 is a front plan view of the third embodiment of the pet bed.
Figure 25:
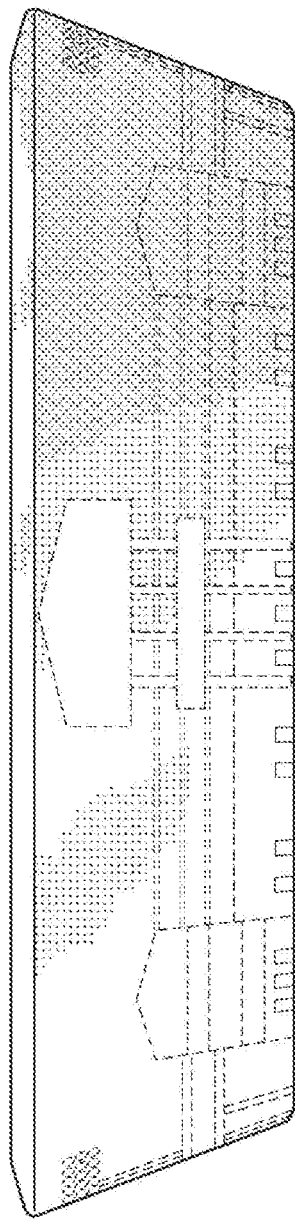
FIG. 25 is a rear plan view of the third embodiment of the pet bed.
Figure 26:
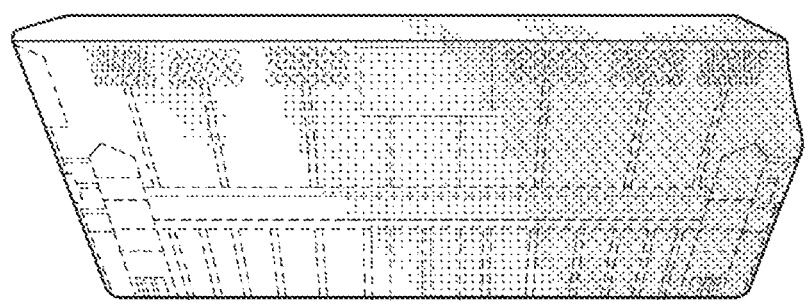
FIG. 26 is a left-side plan view of the third embodiment of the pet bed.
Figure 27:
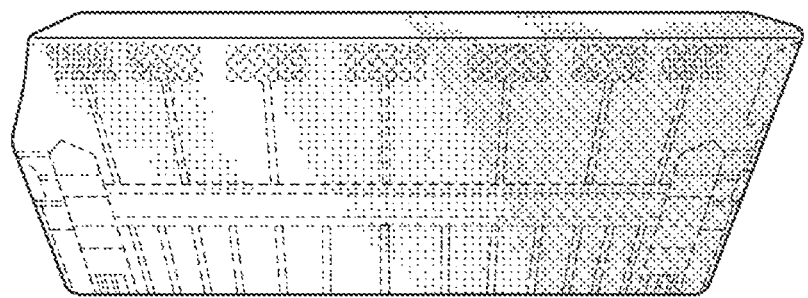
FIG. 27 is a right-side plan view of the third embodiment of the pet bed.
Figure 28:
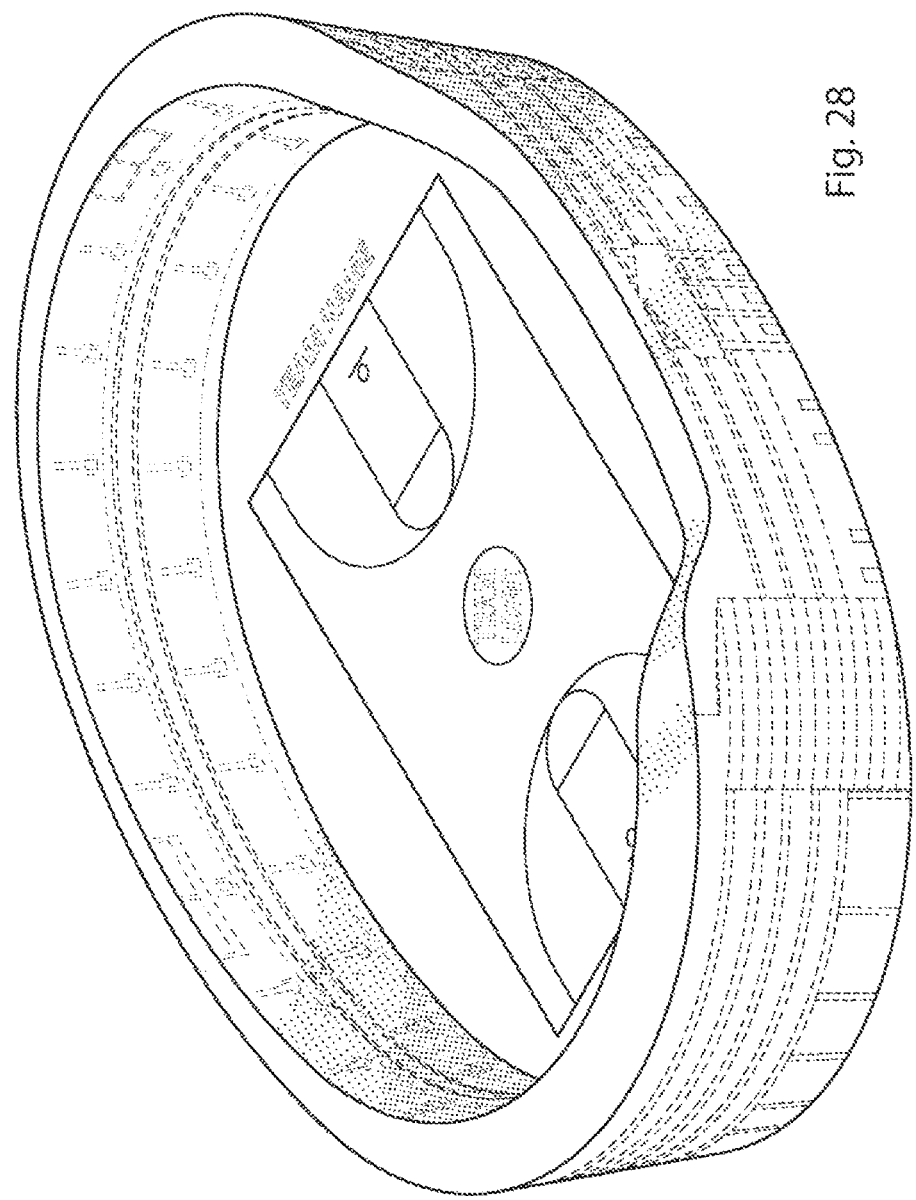
FIG. 28 is a first front-perspective view of a fourth embodiment of a pet bed of the present invention.
Figure 29:
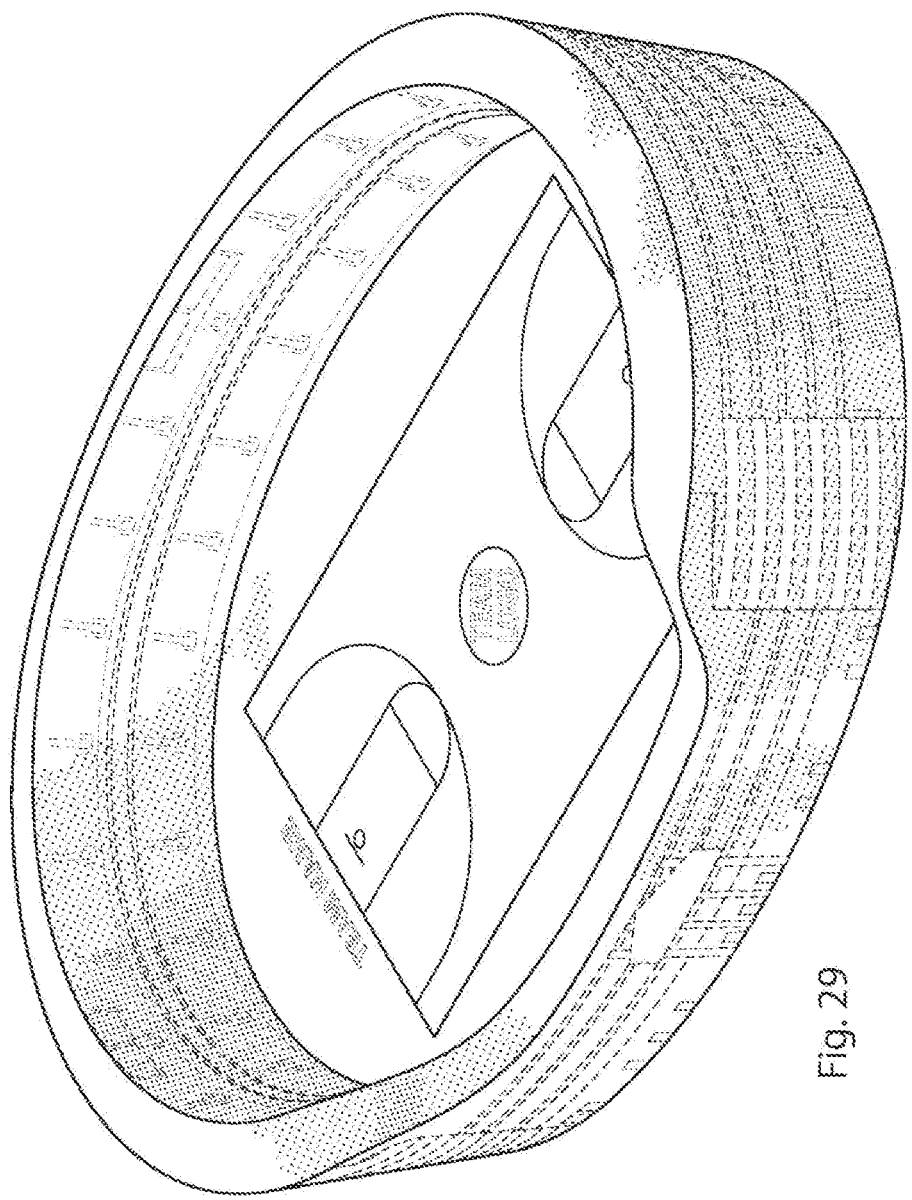
FIG. 29 is a second front-perspective view of the fourth embodiment of the pet bed.
Figure 30:
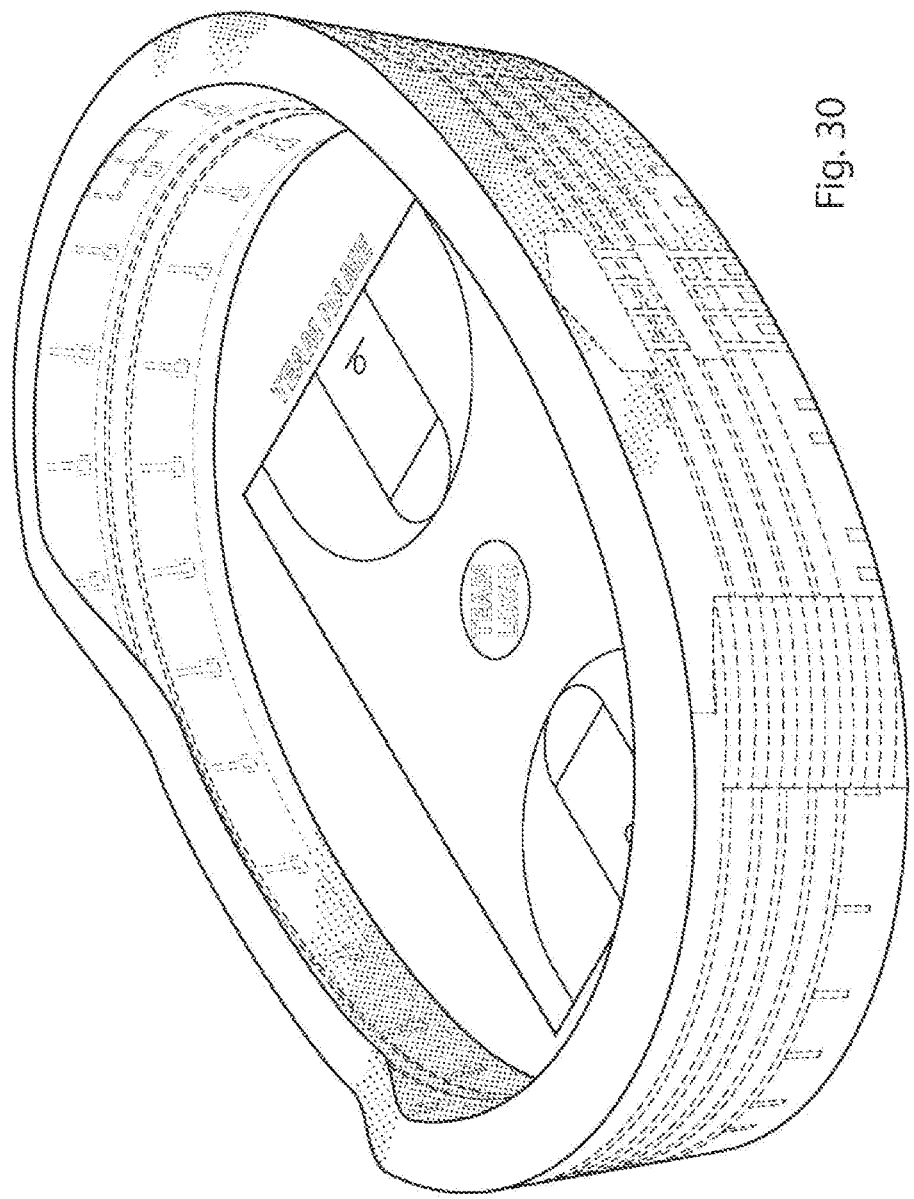
FIG. 30 is a first rear-perspective view of the fourth embodiment of the pet bed.
Figure 31:
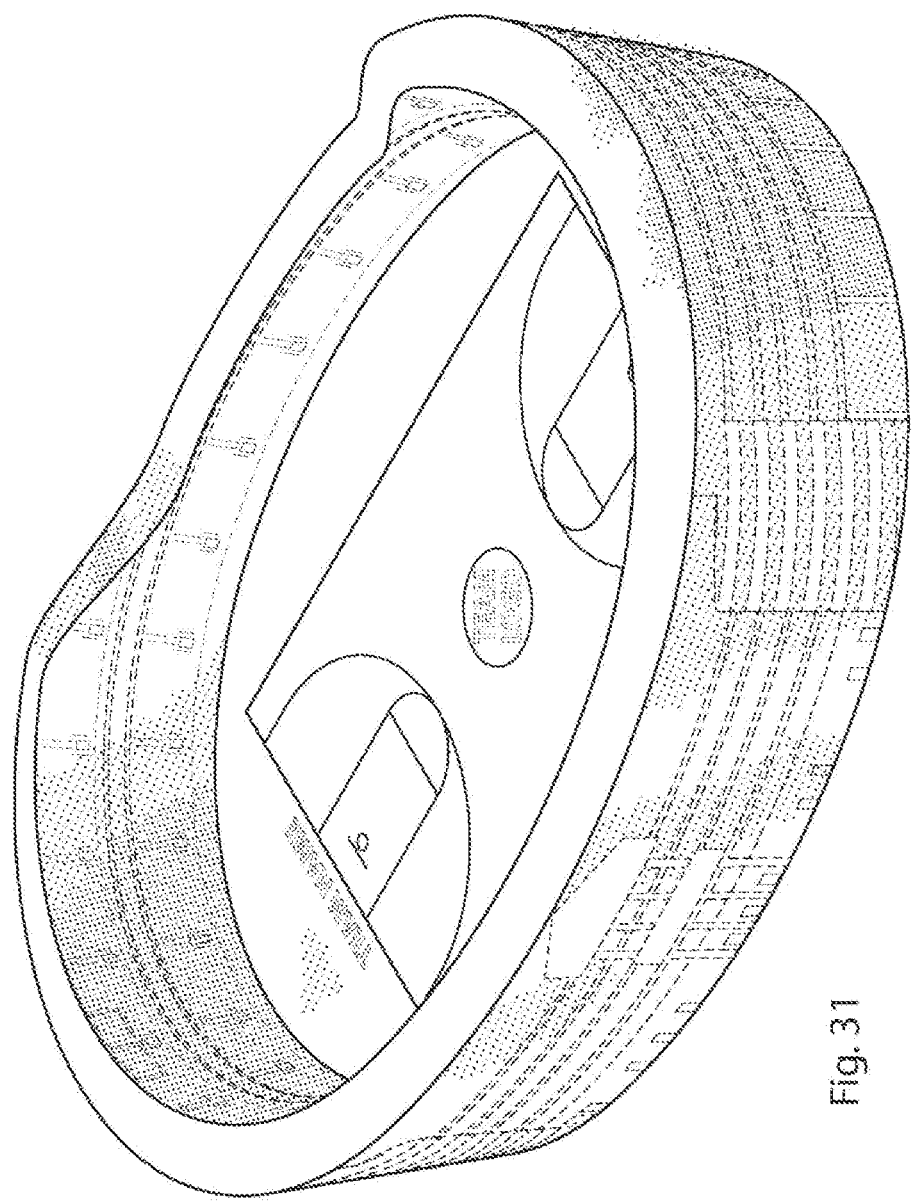
FIG. 31 is a second rear-perspective view of the fourth embodiment of the pet bed.
Figure 32:
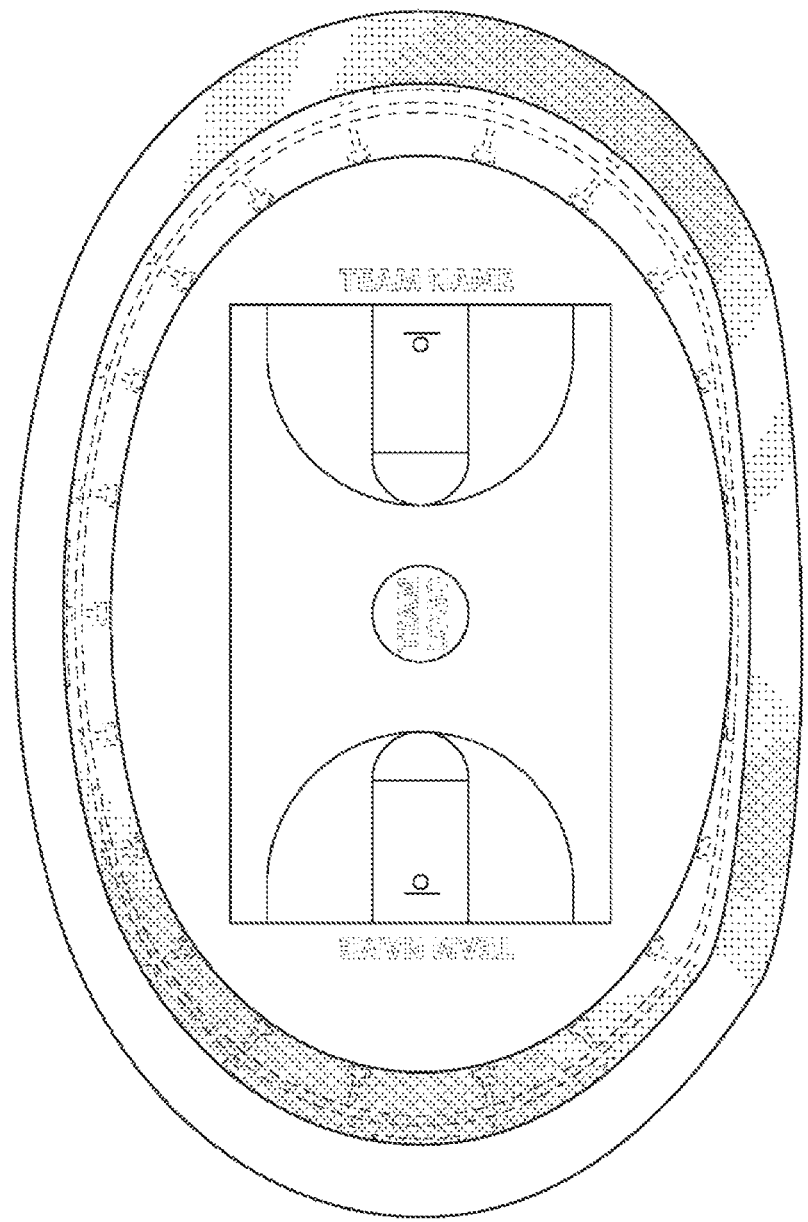
FIG. 32 is a top plan view of the fourth embodiment of the pet bed.
Figure 35:
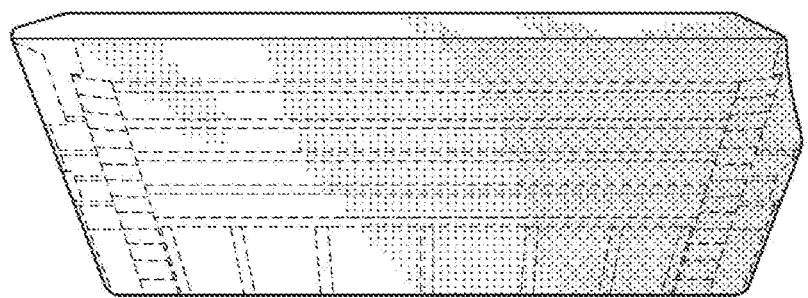
FIG. 35 is a left-side plan view of the fourth embodiment of the pet bed.
Figure 36:
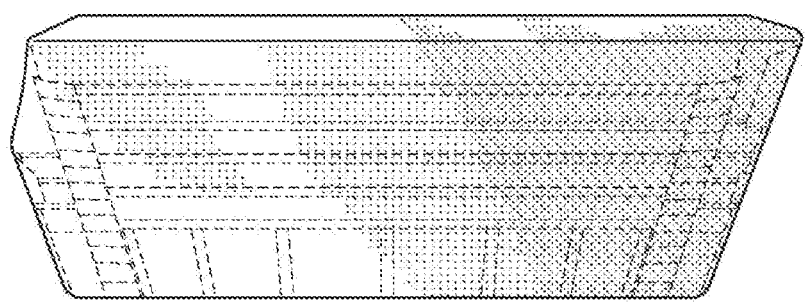
FIG. 36 is a right-side plan view of the fourth embodiment of the pet bed.
Figure 37:
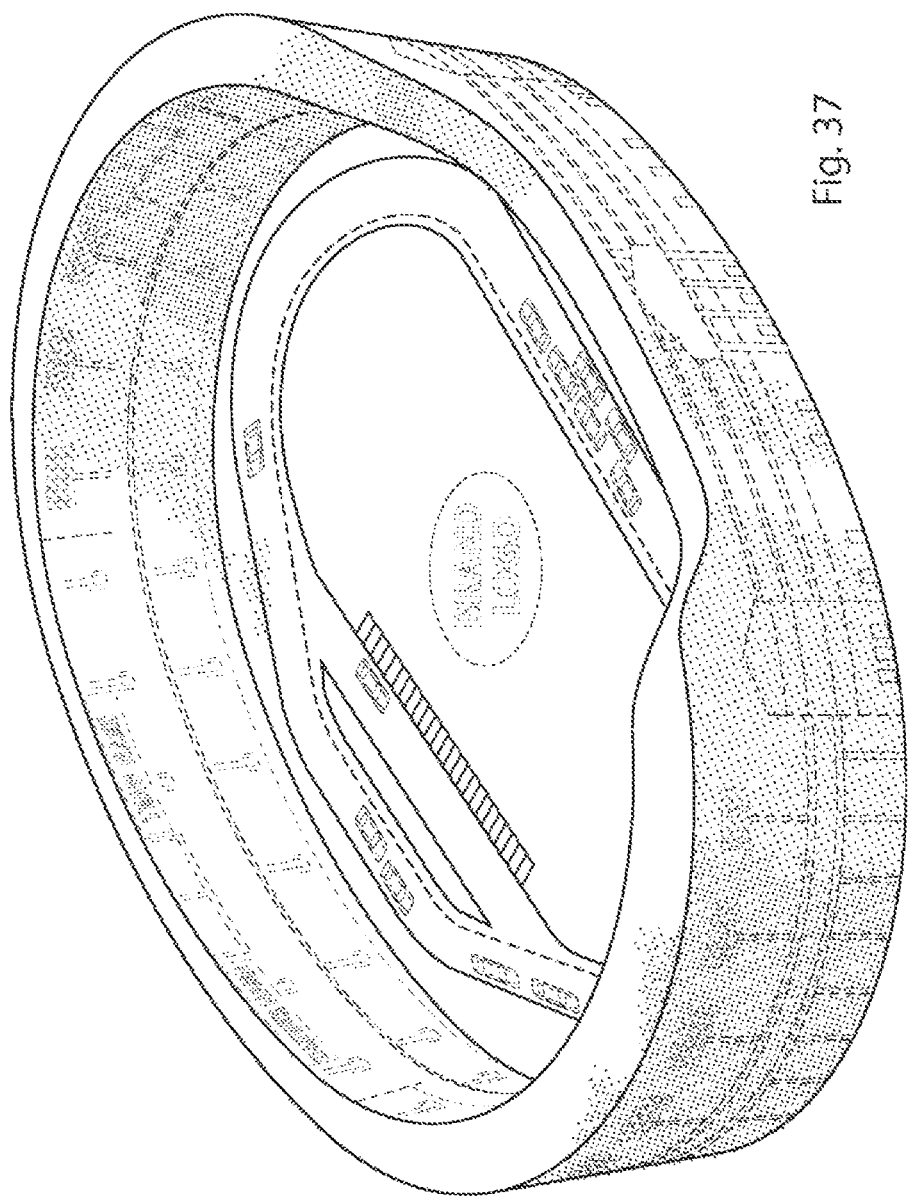
FIG. 37 is a first front perspective view of a fifth embodiment of a pet bed of the present invention.
Figure 38:
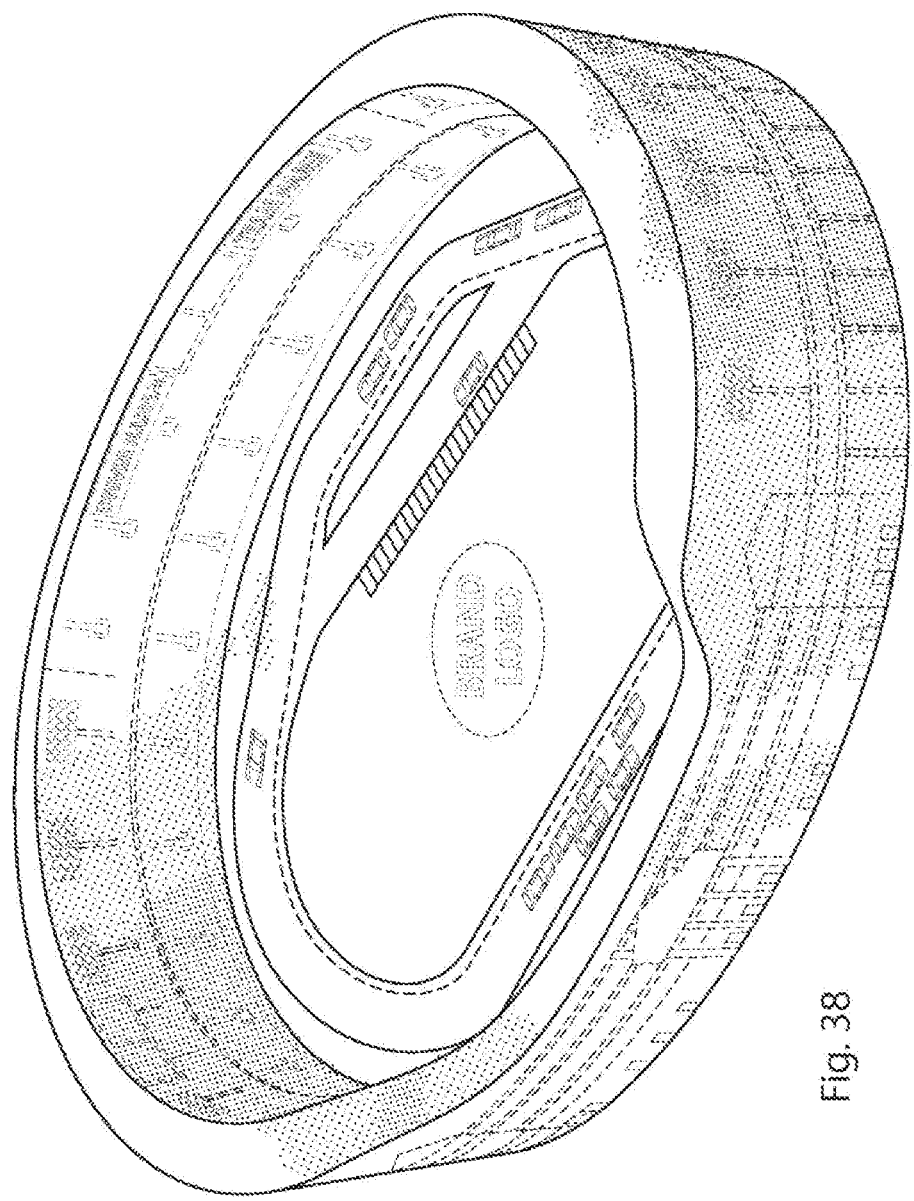
FIG. 38 is a second front perspective view of a fifth embodiment of a pet bed of the present invention.
Figure 39:
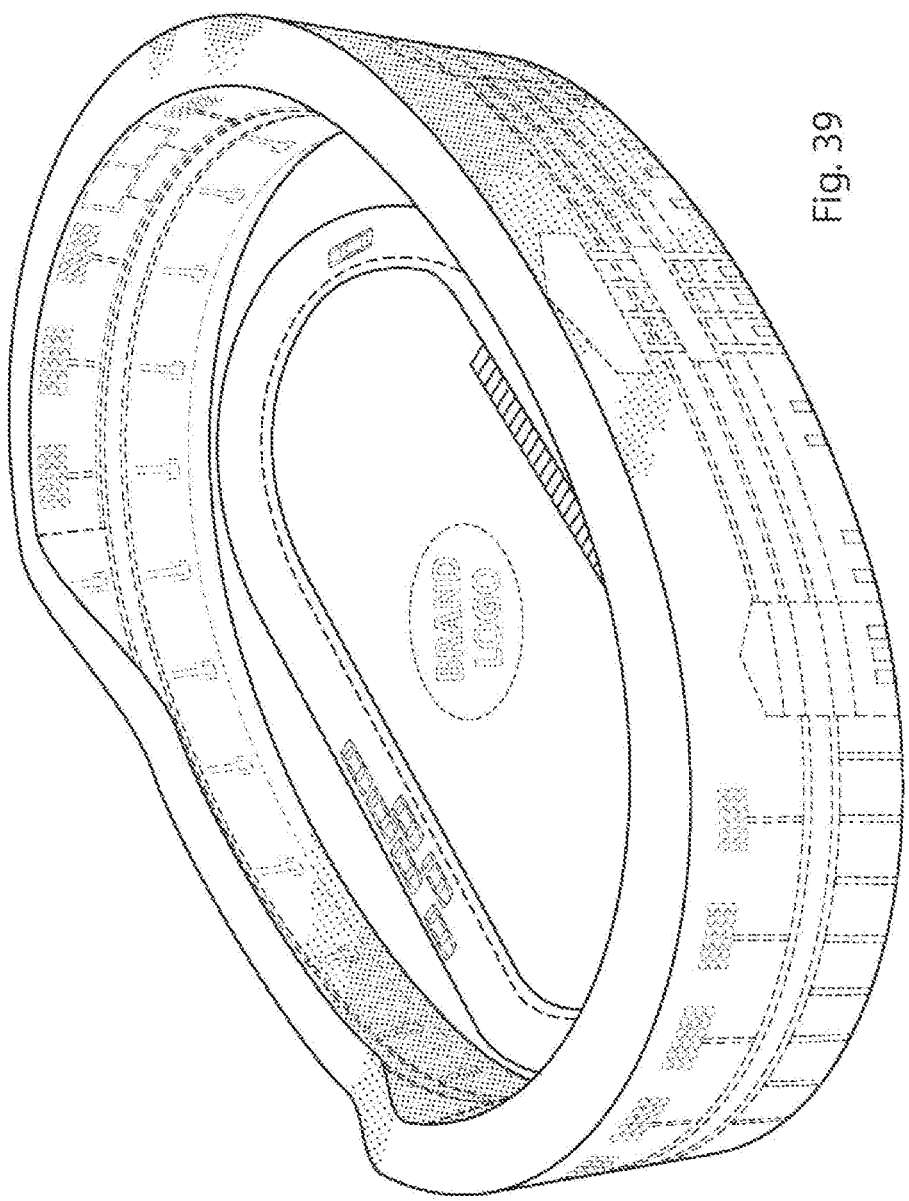
FIG. 39 is a first rear-perspective view of the fifth embodiment of the pet bed.
Figure 40:
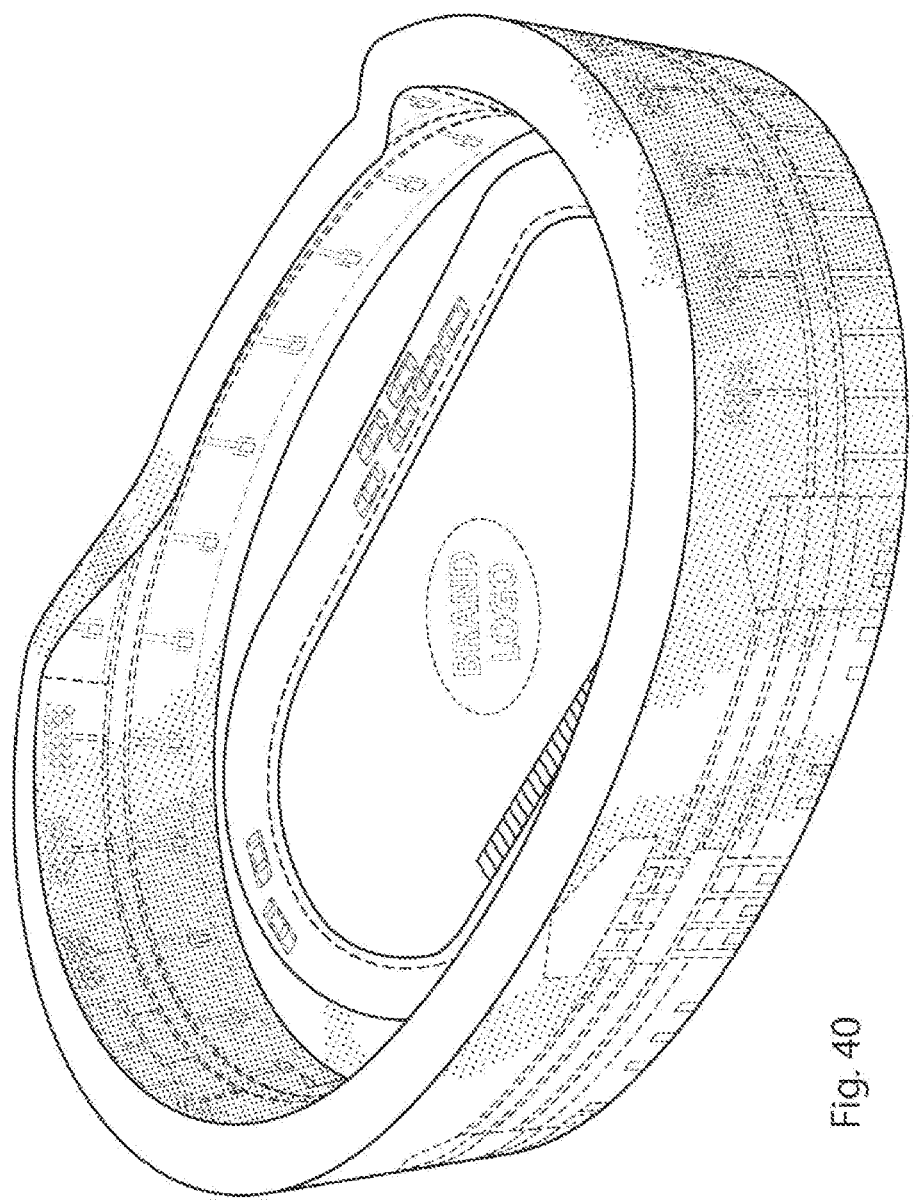
FIG. 40 is a second rear-perspective view of the fifth embodiment of the pet bed.

FIGS. 19-27 include various perspective and plan views of a third embodiment of a pet bed. The third embodiment of the pet bed includes a representation of a baseball diamond or baseball playing field on an observable surface of the pet bed. In the illustrated embodiment, as shown in FIGS. 19-27, the baseball playing field is observable on a surface of a mattress, pillow or insert surrounded by a wall. As is further shown, the inward and outward facing surfaces of the wall may include a representation of a venue that hosts a baseball game. Furthermore, as shown in FIG. 19 and in FIG. 23, the baseball playing field may be accompanied by a team logo in that portion of the baseball playing field commonly known as the outfield and a team name may appear on the inward facing surface of the wall. Moreover, as shown in FIG. 20 and in FIG. 24, the inward facing surface of the wall may also include a representation or label with a location name (e.g., a name of a baseball stadium or a multi-purpose stadium that hosts baseball games) in addition to the team name.

FIGS. 28-36 include various perspective and plan views of a fourth embodiment of a pet bed. The fourth embodiment of the pet bed includes a representation of a basketball court or basketball playing surface on an observable portion of the pet bed. In the illustrated embodiment, the basketball court is observable on a surface of a mattress, pillow or insert surrounded by a wall. As is further shown, the inward and outward facing surfaces of the wall may include a representation of a venue such as an arena that hosts a basketball game. As indicated in FIGS. 28-36, the basketball court may be accompanied by a team logo at center court and a team name in registration with a goal or baseline of the basketball court.

Figure 41:
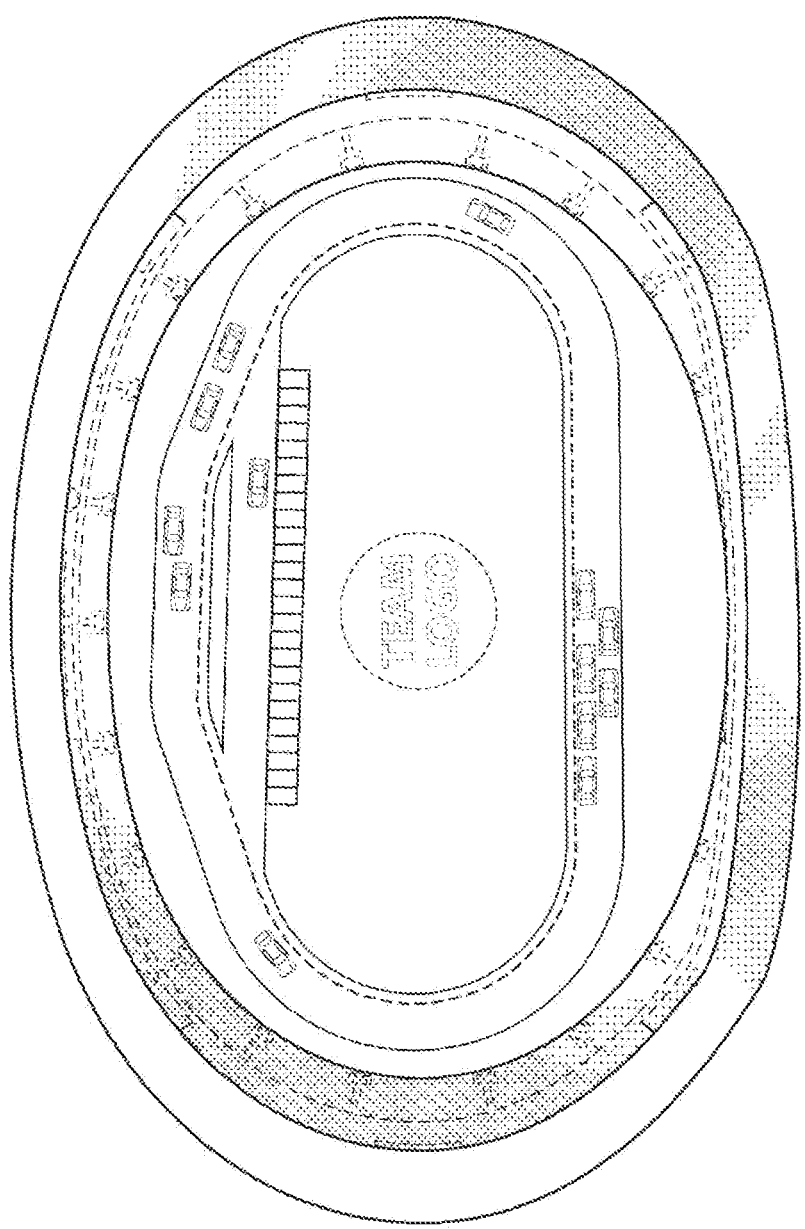
FIG. 41 is a top plan view of the fifth embodiment of the pet bed.
Figure 44:
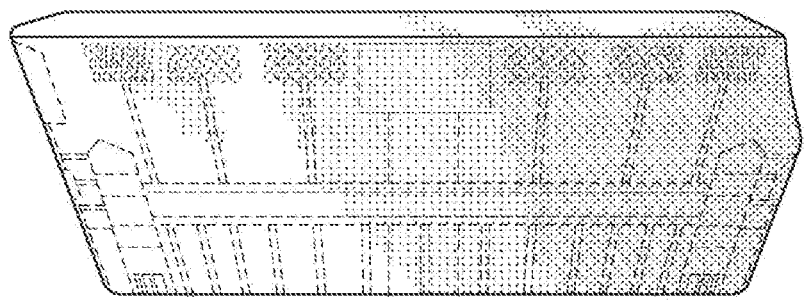
FIG. 44 is a left-side plan view of the fifth embodiment of the pet bed.
Figure 45:
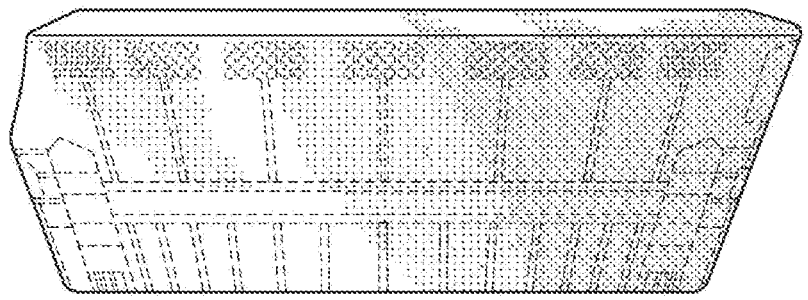
FIG. 45 is a right-side plan view of the fifth embodiment of the pet bed.

FIGS. 37-45 include various perspective and plan views of a fifth embodiment of a pet bed. As shown in FIGS. 37-41, the sixth embodiment of the pet bed includes a representation of an automobile race track on an observable portion of the pet bed. In the illustrated embodiment, the race track is observable on a surface of a mattress, pillow or insert surrounded by a wall. As indicated in FIGS. 37-45, the racetrack may be accompanied by a brand logo in the infield. As shown in FIG. 41, a driving team logo may appear in the infield. As further shown in FIG. 38 and FIG. 42 a driver name and/or a team name may appear on a surface of the wall.

Referring now to FIGS. 46-52, the illustrative structural embodiment of the pet bed 10 of the present invention provided with reference numerals for illustrating the various components and features of an illustrative embodiment of the invention is disclosed in more detail.

Figure 46:
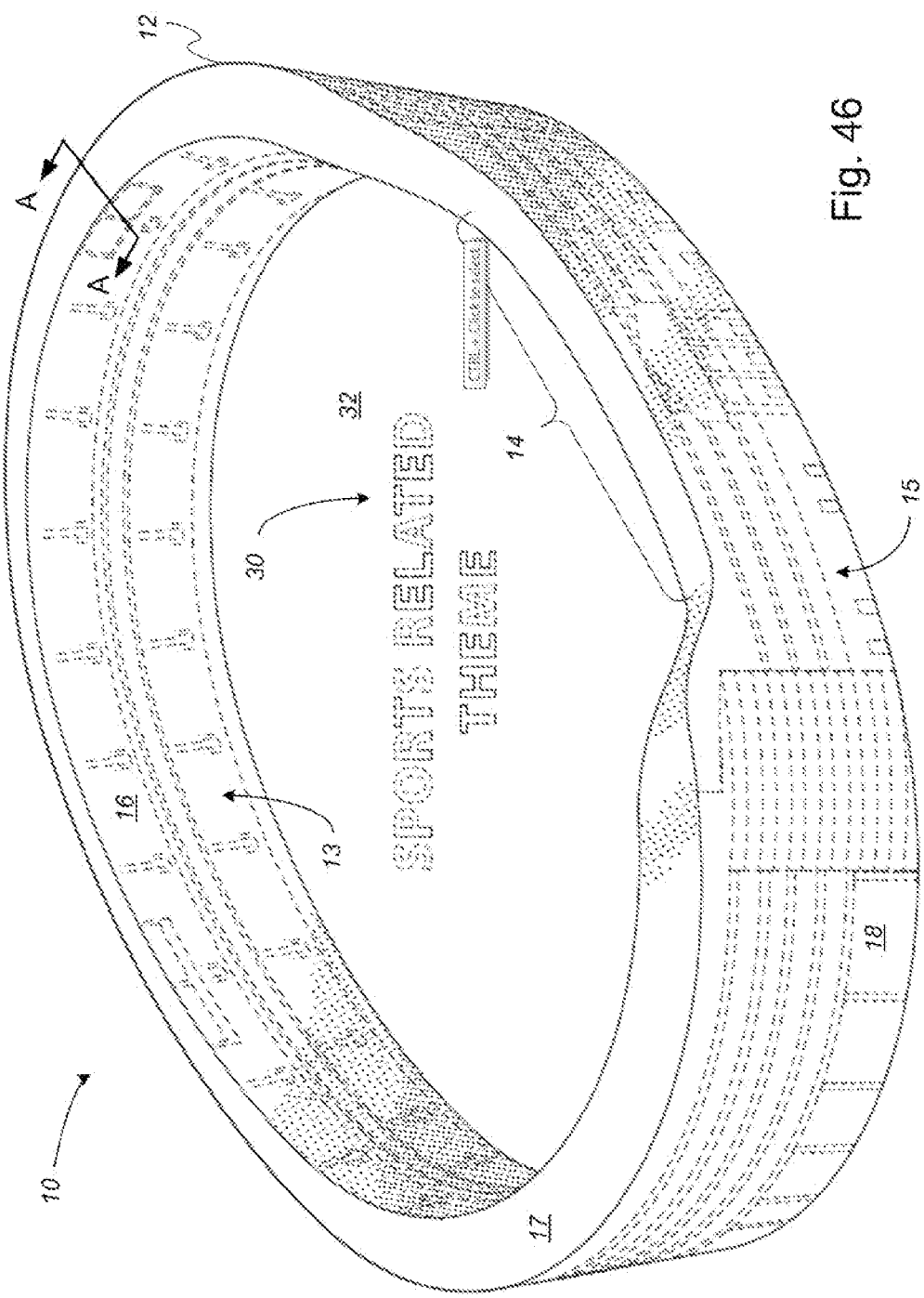
FIG. 46 is a front perspective view of an embodiment of a pet bed of the present invention.
Figure 51:
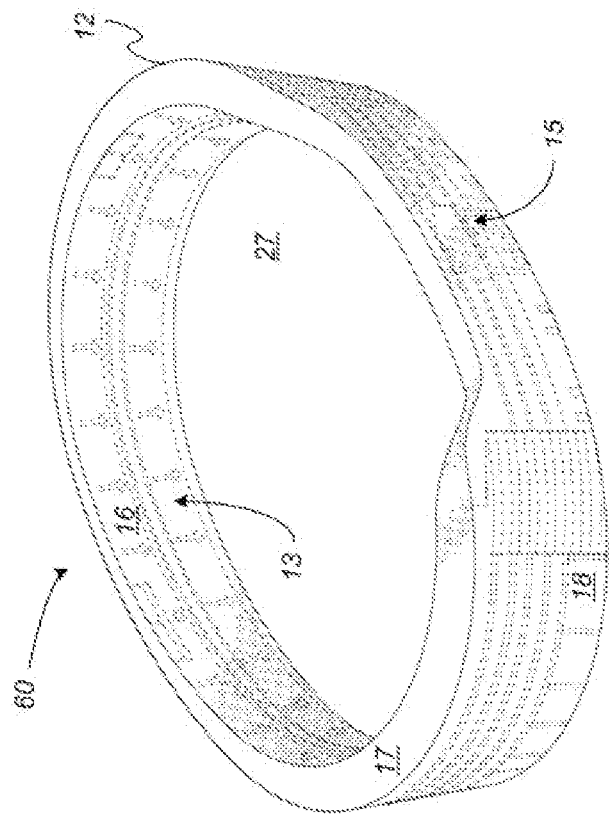
FIG. 51 is a perspective view of the pet bed of FIG. 46 with the insert removed.

FIG. 46 illustrates a perspective view of an embodiment of an improved pet bed 10. In the illustrated embodiment, the wall 12 and the insert 30 of the pet bed 10 are observable, while the base member 20 of the pet bed is obscured from view. However, even with the insert 30 removed, as shown in FIG. 51, the general view of the pet bed 10 is similar. The wall 12, which is continuous about the perimeter of the base member of the pet bed 10, has a portion 14 where the height of the wall 12 is lower to provide easier ingress and egress for the pet. Remaining portions of the wall 12, as indicated by the uppermost surface 17, are arranged with a generally consistent height as measured from an external surface or floor that supports the pet bed 10.

The illustrated embodiment shows that the observable surface 32 of the insert 30 of the pet bed is arranged with an image or label of, preferably, a sports related theme. Other themes are contemplated, such as concerts, dramatic plays, Broadway shows, etc. However, the sports related theme is provided as the exemplary embodiment, and FIGS. 46-52 will be described in regard to the sports related theme. The inward facing surface 13 of the wall 12 is arranged with a complimentary image 16 of a stadium, arena, field house or other venue that hosts the team that is the subject matter of the image on the insert 30 of the pet bed 10. Similarly, the outward facing surface 15 of the wall 12 is arranged with another image 18 of the stadium, arena, field house or other venue that compliments the first two images.

For example, if the sports related theme represented in the image on the uppermost surface 32 of the insert 30 is college football, and the team of interest is The Ohio State University Buckeyes, the image may include a representation of a helmet including the team colors and one or more leaves of a Buckeye tree in a circle. The image on the insert 30 may also include other items commonly observable on a football gridiron (i.e., playing field), such as end zones, uprights, benches, flag poles and the like. When this is the case, the image 16 on the inward facing surface 13 of the wall of the pet bed will be arranged with a representation of the A-C decks (i.e., levels) as well as the South stands and scoreboard of the generally horseshoe-shaped football stadium that hosts the Buckeye home football games and track and field meets. The image 18 on the outward facing surface 15 of the wall of the pet bed is arranged with a representation of the exterior of the football stadium.

In an example embodiment (see FIG. 10), the image on the upward facing surface 32 of the insert 30 includes a football gridiron. In addition, the gridiron may be arranged in registration with a team name and/or a logo.

In an alternative arrangement (see FIG. 19), the image on the upward facing surface 32 of the insert 30 includes a baseball diamond. In addition, the baseball diamond may be arranged in registration with a team logo. In such an arrangement, the inward facing surface 13 of the wall 12 may be arranged with a team name. In alternative arrangements, a portion of the inward or outward facing surfaces 13, 15 of the wall 12 may include a label or labels representing of one or more of a team name, a stadium or venue name, a logo, or a pet's name, as may be desired.

In still another alternative embodiment (see FIG. 28), the image on the upward facing surface 32 of the insert 30 includes a basketball court. In addition, the basketball court may be arranged in registration with a team logo and one or more instances of a team name. In alternative arrangements, a portion of the inward or outward facing surfaces 13, 15 of the wall 12 may include a label or labels representing of one or more of a team name, a stadium or venue name, a logo, or a pet's name, as may be desired.

In another alternative arrangement (see FIG. 37), the image on the upward facing surface 32 of the insert 30 includes a motor sports track or circuit. The motor sports track or circuit may be arranged in registration with a brand logo or name of the motor sports track. The inward facing surface 13 of the wall 12 may be arranged with one or more labels representing a driver's name and a team name. In alternative arrangements, a portion of the inward or outward facing surfaces 13, 15 of the wall 12 may include a label or labels representing of one or more of a venue name, a race sponsor's name, and/or a pet's name, as may be desired.

Figure 47:
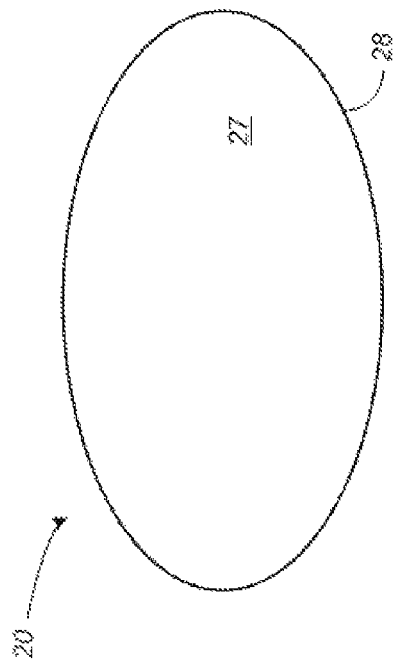
FIG. 47 is a top plan view of a base member of the pet bed of FIG. 46.
Figure 48:
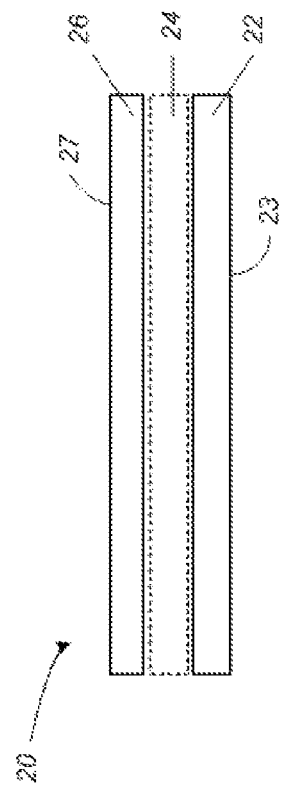
FIG. 48 is a side plan view of the base member of FIG. 47.

FIG. 47 and FIG. 48 illustrate a top plan view and a side plan view, respectively, of a base member 20 of the pet bed of FIG. 46. Although not depicted to scale with the pet bed 10 illustrated in FIG. 46, the base member 20 is substantially the same shape and size of the horizontal lower portion of the pet bed 10 of FIG. 46, analogous to insert 30. In the illustrated embodiment, the base member 20 has a generally oval shape. However, the pet bed 10 is not limited to being an oval. As the pet bed 20 in various alternative embodiments is intended to represent respective entertainment venues, the perimeter of the base member 20 may be circular, rectangular or other geometric shapes. However arranged, the base member 20 may be arranged with an attachment mechanism or more than one attachment mechanism spaced about or near the perimeter 28 for removably attaching the wall 12. Alternatively, the wall 12 may be sewn, glued or fused about the perimeter 28 of the base member.

As illustrated in FIG. 48, the base member 20 includes a support surface 23 associated with a first material layer 22 and a second surface 27 associated with a second material layer 26. An optional substrate 24 lies between the first material layer 22 and the second material layer 26. When the optional substrate 24, which may be plastic, cardboard or other substantially rigid materials, is present, the first material layer 22 may be adhesively attached to an external surface of the substrate 24 with the second material layer 26 adhesively attached to an opposed surface of the substrate. Otherwise, when a substrate is not used, the first material layer 22 may be sewn, glued or fused to the second material layer 26. In some arrangements, the first material layer 22 may include one or more strips or other shapes of a resilient material with a relatively high coefficient of friction to prevent the pet bed 10 from relative movement when placed on a smooth floor.

Alternatively, substrate 24 can be a foam padding or a combination of a foam padding and a substantially rigid material. The use of foam padding as substrate 24 or part of substrate 24 can give extra padding to the pet for added comfort. Also, the use of foam padding as substrate 24 or part of substrate 24 can eliminate the need for using a separate insert 30, in which case the pet can sit, lay, rest, or sleep directly on base member 20. Thus, as another alternative, an upward facing surface of base member 20 can include the image mentioned above that is on the upward facing surface 32 of insert 30, such as a football field, soccer field, baseball field, motor sports track, etc.

If an insert 30 is used, the upper surface of base member 20 can include fastening means for releasably holding insert 30 onto base member. Such a fastening means can have complimentary parts, one of which is on the upper surface base member 20 and the other of which is on the lower surface of insert 30. Hook and loop fasteners, hook and eye fasteners, clips, and others fasteners can be used.

Figure 49:
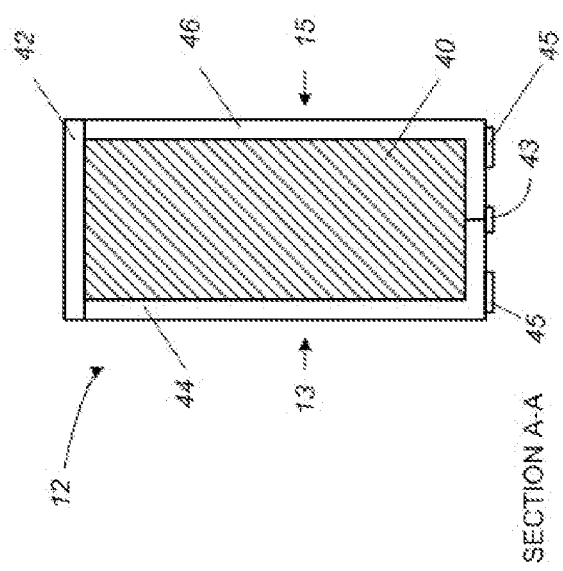
FIG. 49 is a cross-sectional view of the wall of FIG. 46.

FIG. 49 is a cross-sectional view of the wall of FIG. 46 in the direction of line A-A. As shown in section A-A, the wall 12 includes a layer of foam 40 encompassed by a fabric panel 42 arranged along the uppermost surface of the wall, a fabric panel 44 arranged along a left-side of the wall 12 and a fabric panel 46 arranged along a right-side of the wall 12. The fabric panel 42 is preferably sewn to the fabric panels 44, 46 at seams proximal to the top of the wall 12. Fabric panel 44 provides the inward facing surface 13 with the first image or representation of the entertainment venue. Fabric panel 46 provides the outward facing surface with the third image or representation of the entertainment venue.

As further illustrated in FIG. 49, the fabric panel 44 has an attachment mechanism 45 such as a hook and loop fastener arranged along the underside thereof. The fabric panel 46 is similarly arranged with a respective attachment mechanism 45 such as a hook and loop fastener arranged along the underside thereof. A complimentary attachment mechanism such as the other of the hook and loop fastener may be provided along the second surface of the base member 20 in registration with the attachment mechanisms 45 for removably attaching the wall 12 to the base member 20. Alternatively, the wall 12 and the base member 20 can be more permanently or permanently attached to one another, such as by thread, staples, adhesives, etc.

As also illustrated in FIG. 49, the fabric panel 44 and the fabric panel 46 are connected to one another at least in part by an attachment mechanism 43 arranged along the underside of the wall 12. In a preferred embodiment, the attachment mechanism 43 is a zipper, which permits access to and egress of the layer of foam 40 from the wall 12 to enable the wall 12 to be easily laundered.

Figure 50:
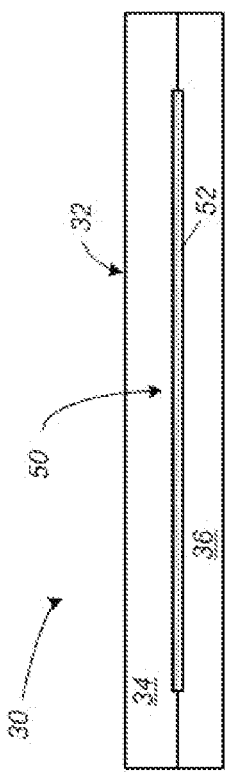
FIG. 50 is a side plan view of the insert of FIG. 46.

FIG. 50 is a side plan view of the insert 30 of FIG. 46. The insert 30 is constructed with first and second panels of fabric 34, 36 that enclose a layer of foam. The first panel 34 includes the second image along the upper surface 32, which is observable when appropriately arranged within the area defined by the wall 12 in the interior of the pet bed 10 above the second surface 27 of the base member 20. At least a portion of the insert 30 is arranged with an access/egress port 50 that enables removal of the mattress or layer of foam therein. The access/egress port 50 may be closed with any number of various attachment mechanisms such as a zipper 52, buttons in registration with button holes, loops, laces, clasps, buckles in registration with corresponding straps, etc.

FIG. 51 is a perspective view of the pet bed 10 of FIG. 46 with the insert 30 removed. With the insert 30 removed, the combination of the wall 12 and the base member 20 form a shell 60. As disclosed herein, the upper surface of base member 20 also can have an image provided thereon, such that the pet bed 10 can be used with or without insert 30 and still show a field or floor image.

Figure 52:
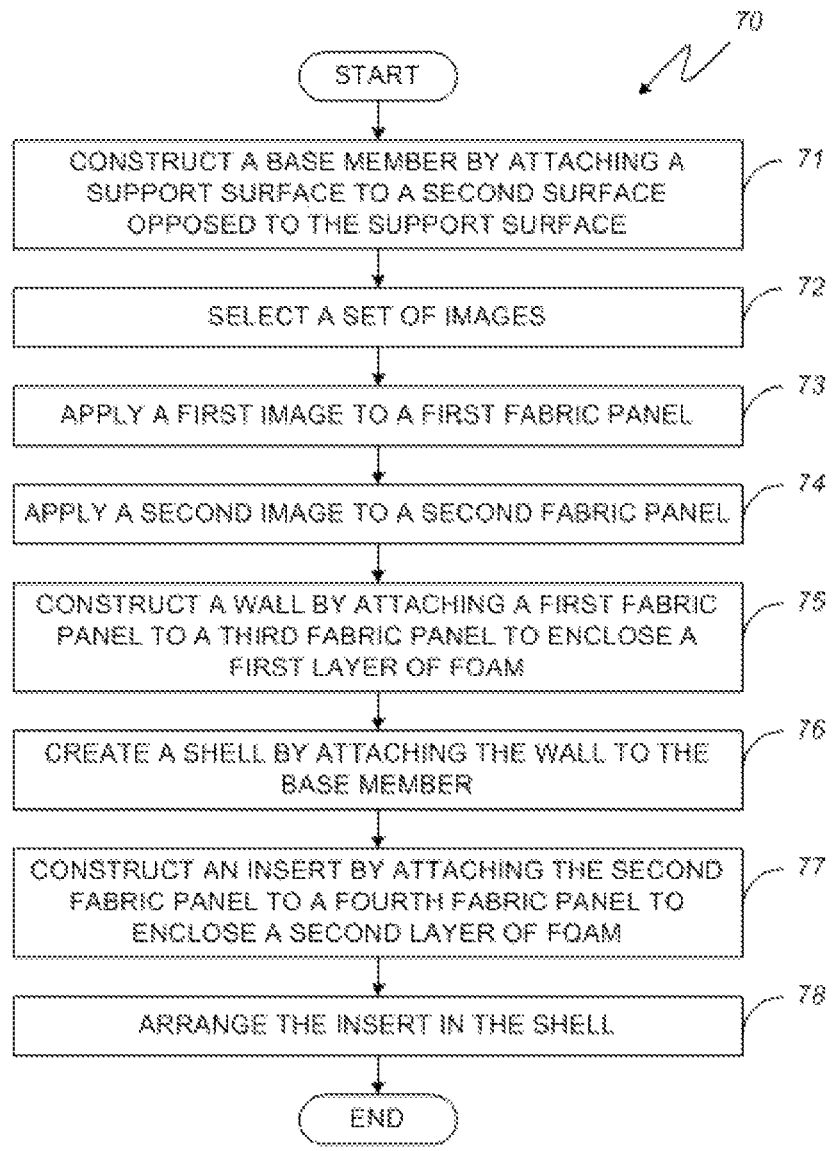
FIG. 52 is a flow diagram of an embodiment of a method for manufacturing a pet bed of the present invention.

FIG. 52 is a flow diagram of an embodiment of a method 70 for manufacturing a pet bed representative of the present invention, such as the pet bed 10. The method 70 for manufacturing the pet bed 10 begins with block 71 where a base member 20 is constructed by attaching a support surface 23 to a second surface 27 opposed to the support surface 23. In block 72, a set of images including at least a first image and a second image is selected. In block 73, the first image is applied to a first fabric panel 44. In block 74, the second image is applied to a second fabric panel 34. Thereafter, as indicated in block 75, the first fabric panel 44 is attached to a third fabric panel 46 to encapsulate a first layer of foam 40 to generate a wall 12. Next, as indicated in block 76, the wall 12 is attached along a perimeter 28 of the base member 20. In block 77, the second fabric panel 34 is attached to a fourth fabric panel 36 about a second layer of foam to create an insert 30. Thereafter, as indicated in block 78, the completed insert 30 is arranged in the shell 60.

It should be understood that several of the steps in the method 70 may be performed out of the described sequence and/or substantially in parallel with each other. For example, the set of images may be selected before or substantially simultaneously with the construction of the base member. By way of further example, the respective images may be transferred simultaneously to corresponding panels of fabric. By way of still further example, the insert can be constructed before or substantially simultaneously with the creation of a shell by connecting the wall to the base member.

The images can be applied to the surfaces of the wall 12, the insert 30, and/or the base member 20 by arranging a respective transfer medium (each having an image thereon) in registration with the first fabric panel and the second fabric panel and introducing a controlled source of heat energy near the fabric panels and the transfer mediums. This may be combined with the application of a compressive force to respective opposed surfaces of the transfer medium and the first and second fabric panels, such as by the surfaces of a press (not shown) for a desired time so as to transfer the image from the respective transfer medium to the corresponding fabric panel. Alternatively, the images can be applied via paints, such as fabric paints or markers. Also alternatively, the fabric of the pet bed itself can be woven to include the desired images. Also alternatively, various pieces of fabric or material can be sewn or attached together to produce the desired images.

Preferred embodiments of the improved pet bed 10 will include sets of images that are paired to represent corresponding representations of an entertainment venue (e.g., a university stadium, a concert, a theater, or a scene from a motion picture). A first image is applied to an inner surface 13 of the wall 12. The first image may include patrons attending a sporting event or a concert. In other embodiments the image may include a background scene from a motion picture, or other desired subject matter. A second image is applied on the second or an observable surface 32 of the insert 30 or the base member 20. The second image may include a playing field, a game surface, a racetrack, a soundstage, or subject matter from a motion picture, or other desired subject matter that compliments the first image.

Some embodiments of the improved pet bed 10 will include a third image applied to a generally opposing outer surface 15 of the wall 12. The third image may include a representation of the exterior of a venue, a mascot, a design in team colors, a sign, a symbol or other subject matter as may be desired. The third image may include a label or labels such as a word, a set of words, such as a name by which the venue, a mascot, a team and or a pet is known. In some arrangements the label or labels will appear absent the representation of the exterior of the venue, a mascot, a design, a sign, symbol or other subject matter. Alternatively, on or more of these items may appear in conjunction with a label or labels as may be desired.

In some embodiments the base member 20 may include a support surface manufactured from a first material that is resistant to relative motion between the support surface of the pet bed and an external surface such as a floor, such as a non-slip material. In some arrangements, the first material may be an animal product, such as leather, or other natural product such as a fabric of natural fibers. In alternative embodiments, the first material may be a man-made product such as various plastics, vinyls or fabrics made from synthetic fibers. Whether natural or man-made, the first material may be arranged in a sheet or layer or in strips, blocks, or other shapes (e.g., a paw print) attached to a substrate. A second surface opposed to the support surface of the base member may be manufactured from a second material such as fabric. The fabric may be fixed to the first material and/or an intervening substrate or substrates by being sewn, glued, fused or otherwise attached with various types of fasteners.

In preferred embodiments, the wall 12 is constructed with first and second panels 44, 46 of fabric that enclose a layer of foam 40. The first panel 44 includes the first image, which faces the interior of the pet bed 10. The second panel 46 includes the third image, which appears on the exterior of the pet bed 10. The wall 12 is fixed or removably attached near or at the perimeter of the base member 20. As the pet bed 10 is desired in some embodiments to depict an identified entertainment venue, the base member 20 may be arranged in a scale representation of one or more of an oval, a circle, or other shape intended to replicate the identified entertainment venue.

As disclosed, the wall 12 may be fixed or removably attached by any of a number of known attachment mechanisms. For example, the wall 12 may be fixed by being sewn, glued or fused to the base member 20 to form a shell. By way of further example, the wall 12 may be removably attached through the application of one or more zippers, buttons, clasps, snaps, hook and loop fasteners, laces, hooks, buckles and straps arranged along the perimeter of the base member 20 and an edge of the wall 12.

In still other preferred embodiments, the wall 12 is continuous about the perimeter of the base member 20. In these example arrangements, at least one portion of the wall 12 has a height such that a furthermost or upper surface of wall 12 is closer to the base member 20 than a remaining portion of the wall 12 so as to form the ingress/egress 14. Thus, this at least one portion of the wall 14 defines a location for easy access or egress to the pet bed 10. This at least one portion of the wall 12 may be arranged with a layer of fabric or other material that is attached to the exterior of the wall 12. This additional material layer may be manufactured with a material or fabric selected for its ability to be cleaned, mask dirt or the accumulation of hair, and/or protect the integrity of the wall 12, as this portion of the wall is likely to be exposed to more dirt and wear as the pet uses this portion of the wall 12 for access and egress.

In preferred embodiments, the insert 30 is constructed with first and second panels 34, 36 of fabric that enclose a layer of foam. The first panel 34 includes the second image, which is observable when appropriately arranged within the area defined by the wall 12 in the interior of the pet bed 10 above the second surface of the base member 20. At least a portion of the insert 30 is arranged with an access/egress port 52 that enables removal of the mattress or layer of foam therein. The access/egress port 52 may be closed with any number of various attachment mechanisms such as a zipper, buttons with corresponding loops and/or button holes, snaps, hooks with corresponding loops, clasps, hook and loop fasteners, laces, buckles and straps.

The fabric used to construct the wall 12 and the insert 30 and other appropriate portions of the pet bed, such as the upper surface of the base member 20 in certain embodiments, may be a 100% polyester duck weighing approximately 7 ounces per sq. yard. Such fabric is suitable for both indoor and outdoor use and is durable. Type 600 polyester duck is compatible with dye sublimation, ultraviolet and latex printing methods. However, a present preferred printing method includes using heat combined with pressure from opposed pressing surfaces to transfer an image from a transfer medium in contact with a fabric with a suitable background color or print.

As is known, the fabrics used to construct any portion of the insert 30, the base member 20, and the wall 12 may be treated with one or more agents or compounds to achieve one or more desired characteristics such as stain, water, or fire resistance among other characteristics including resistance to microbial growth. Therefore, other fabric types can be used, including, for example, silk or satin for more expensive or fancier embodiments of the pet bed 10, plastic or rubber for more durable or outdoors embodiments of the pet bed 10, etc.

The improved pet bed 10 can be constructed of many different sizes suitable for various breeds of cats, dogs or other household pets. For example, a pet bed 10 constructed in accordance with the claims can be arranged for relatively small size pets. Such a pet bed fits within a footprint of about 410 in. sq. Such a footprint may have a length of approximately 22 inches and a width of approximately 18 inches. The height of the wall for a small pet bed may vary from about 6 inches to about 10 inches. By way of further example, a pet bed suitable for relatively medium size pets may fit within a footprint of about 620 in. sq. Such a footprint may have a length of approximately 31 inches and a width of approximately 20 inches. The height of the wall for a medium-size pet bed may vary from about 8 inches to about 12 inches. A pet bed suitable for relatively large pets may be arranged with a footprint of about 975 in. sq. Such a footprint may have a length of about 37.5 inches and a width of about 26 inches. The height of the wall for a large-size pet bed may vary from about 10 inches to about 15 inches or more. These are illustrative dimensions, and these dimensions can be varied as desired.

The foam layer used in the insert 30 may be constructed of polyurethane and may be provided in various thicknesses and densities with the thickness of the foam layer used in the insert 30 of a relatively larger pet bed 10 being comparatively thicker and generally being denser than a foam layer used in the insert 30 of a relatively smaller pet bed 10. Similarly, the foam layer used in the wall 12 may be constructed of polyurethane and may be provided in various thickness and densities so as to vertically support a desired height of the wall 12.

Thus, a first illustrative embodiment of the invention is pet bed, comprising a generally horizontal base member having a first base surface as a support surface and a second base surface opposed to the support surface; at least one generally vertical wall coupled to and extending generally upwards from the base member, the wall having a first wall surface arranged with a first representation, a second wall surface opposed to the first wall surface and at least one region where a height of the wall is closer to the base member than a remaining region of the wall; and an insert resting on the second base surface within an area bounded by the at least one wall, the insert having a first insert surface substantially parallel to the second base surface and arranged with a second representation.

A second illustrative embodiment of the invention is a pet bed, comprising a generally horizontal base member having a first base surface as a support surface and a second base surface opposed to the support surface; at least one generally vertical wall coupled to and extending generally upwards from the base member, the wall having a first wall surface arranged with a first representation, a second wall surface opposed to the first wall surface and at least one region where a height of the wall is closer to the base member than a remaining region of the wall; and a second representation on the second base surface.

Other embodiments include a third representation on the second wall surface. Still other embodiments can include a further representation on top or other surfaces of the wall.

While the pet bed 10 has been described in connection with certain preferred embodiments, it is not intended to limit the scope of the pet bed 10 to the particular forms set forth, but is intended to cover such alternatives, modifications, and equivalents as may be included within the scope of the pet bed 10 as defined by the appended claims.

What is claimed is:

1. A pet bed, comprising:
    a generally horizontal base member having a first base surface as a support surface and a second base surface opposed to the support surface;
    at least one generally vertical wall coupled to and extending generally upwards from the base member, the wall having a first wall surface arranged with a first representation, a second wall surface opposed to the first wall surface, and at least one region where a height of the wall is closer to the base member than a remaining region of the wall, wherein the at least one wall is continuous and arranged about a perimeter of the base member, wherein the at least one wall includes a layer of foam encompassed by a fabric cover a portion of which defines the first wall surface arranged with the first representation, and wherein the at least one wall defines at least a portion of a perimeter that represents a scale replica of a venue; and
    an insert resting on the second base surface within an area bounded by the at least one wall, the insert having a first insert surface substantially parallel to the second base surface and arranged with a second representation, the insert comprising a second layer of foam covered by at least one fabric panel so as to create the insert,
    wherein the at least one wall is fixed about a perimeter of the base member.

2. The pet bed of claim 1, wherein the insert includes a mattress and a fabric cover that encompasses the mattress and is enclosed by one or more attachment means selected from a group consisting of zippers, buttons, clasps, snaps, hook and loop fasteners, laces, hooks, buckles and straps.

3. The pet bed of claim 1, wherein the first representation includes a first image of the venue selected from the group consisting of a sporting event, a concert, and a scene from a motion picture.

4. The pet bed of claim 3, wherein the second representation includes a second image selected from the group consisting of a field, a game surface, a racetrack, a soundstage, and a subject of a scene from a motion picture.

5. The pet bed of claim 4, wherein the second wall surface includes a third image selected from the group consisting of an exterior of a venue, a mascot, a design in team colors, and a sign or symbol associated with a team.

6. The pet bed of claim 4, wherein the second wall surface includes a word or set of words by which at least one of a venue, a mascot, a team, and a pet is known.

7. A pet bed, comprising:
    a generally horizontal base member having a first base surface as a support surface and a second base surface opposed to the support surface; and
    at least one generally vertical wall coupled to and extending generally upwards from the base member, the wall having a first wall surface arranged with a first representation, a second wall surface opposed to the first wall surface, and at least one region where a height of the wall is closer to the base member than a remaining region of the wall, wherein the at least one wall is continuous and arranged about a perimeter of the base member, wherein the at least one wall includes a layer of foam encompassed by a fabric cover a portion of which defines the first wall surface arranged with the first representation, and wherein the at least one wall defines at least a portion of a perimeter that represents a scale replica of a venue,
    wherein the second base surface is arranged with a second representation, and
    wherein the at least one wall is fixed about a perimeter of the base member.

8. The pet bed of claim 7, wherein the first representation includes a first image of the venue selected from the group consisting of a sporting event, a concert, and a scene from a motion picture.

9. The pet bed of claim 8, wherein the second representation includes a second image selected from the group consisting of a field, a game surface, a racetrack, a soundstage, and a subject of a scene from a motion picture.

10. The pet bed of claim 9, wherein the second wall surface includes a third image selected from the group consisting of an exterior of a venue, a mascot, a design in team colors, and a sign or symbol associated with a team.

11. The pet bed of claim 9, wherein the second wall surface includes a word or set of words by which at least one of a venue, a mascot, a team, and a pet is known.

12. A method for manufacturing a pet bed, the method comprising:
    selecting a set of images including at least a first image and a second image;
    applying the first image to a first fabric panel;
    applying the second image to a second fabric panel;
    attaching the first fabric panel to a third fabric panel to encapsulate a first layer of foam;
    attaching the third fabric panel along a perimeter of a base member;
    attaching the second fabric panel to a fourth fabric panel about a second layer of foam to create an insert; and
    arranging the insert on the base member.

13. The method of claim 12, wherein applying the first image and applying the second image further include:
    arranging a respective transfer medium in registration with the first fabric panel and the second fabric panel;
    introducing a controlled source of heat energy;
    applying a compressive force to a respective opposed surface of the transfer medium and the first and second fabric panels.

14. The method of claim 12, wherein at least one of the steps of attaching the first fabric panel to the third fabric panel, attaching the third fabric panel along the perimeter of the base member, and attaching the second fabric panel to the fourth fabric panel include the step of using one or more attachment means selected from a group consisting of zippers, buttons, clasps, snaps, hook and loop fasteners, laces, hooks, buckles, glues, adhesive strips and straps.

* * * * *